United States Patent [19]
Sasaki et al.

[11] Patent Number: 5,732,554
[45] Date of Patent: Mar. 31, 1998

[54] EXHAUST GAS PURIFICATION DEVICE FOR AN INTERNAL COMBUSTION ENGINE

[75] Inventors: Shizuo Sasaki, Numazu; Satoshi Iguchi, Mishima; Kenji Katoh, Sunto-gun, all of Japan

[73] Assignee: Toyota Jidosha Kabushiki Kaisha, Aichi, Japan

[21] Appl. No.: 600,795

[22] Filed: Feb. 13, 1996

[30] Foreign Application Priority Data

Feb. 14, 1995 [JP] Japan ................. 7-025298

[51] Int. Cl.⁶ .................... F01N 3/20; F02M 25/06
[52] U.S. Cl. .................... 60/278; 60/285; 60/301; 60/311
[58] Field of Search ............ 60/278, 285, 301, 60/311

[56] References Cited

U.S. PATENT DOCUMENTS

| | | |
|---|---|---|
| 4,841,936 | 6/1989 | Takahashi . |
| 5,119,780 | 6/1992 | Ariga . |
| 5,172,550 | 12/1992 | Takeshima ............... 60/278 |
| 5,233,830 | 8/1993 | Takeshima ............... 60/278 |
| 5,473,887 | 12/1995 | Takeshima ............... 60/285 |

FOREIGN PATENT DOCUMENTS

| | | |
|---|---|---|
| A-0492989 | 7/1992 | European Pat. Off. . |
| WO-A-9221871 | 12/1992 | European Pat. Off. . |
| A-0560991 | 9/1993 | European Pat. Off. . |
| 6-129246 | 5/1994 | Japan . |
| 6-31761 | 11/1994 | Japan . |
| WO 93/07363 | 4/1993 | WIPO . |

*Primary Examiner*—Douglas Hart
*Attorney, Agent, or Firm*—Kenyon & Kenyon

[57] ABSTRACT

In the exhaust gas purification device of the present invention, a $NO_x$ absorbent is disposed in the exhaust gas passage of a diesel engine. At the time when $NO_x$ should be released from the $NO_x$ absorbent, a control circuit of the engine reduces the excess air ratio of the engine, and switches the combustion mode of the engine from the normal diesel combustion, in which diffusive combustion is dominant in the combustion chamber of the engine, to the combustion mode in which pre-mixture fuel combustion is dominant. By doing this, it is possible, even in a diesel engine, to reduce the excess air ratio in combustion to thereby make the air-fuel ratio of the exhaust gas lower than or equal to the stoichiometric. Thus, the regeneration of the $NO_x$ absorbent can be performed even when it is applied to a diesel engine.

21 Claims, 17 Drawing Sheets

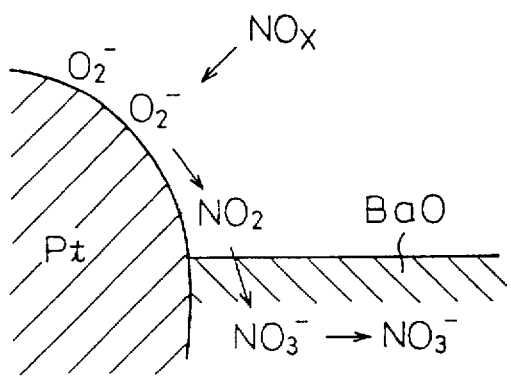
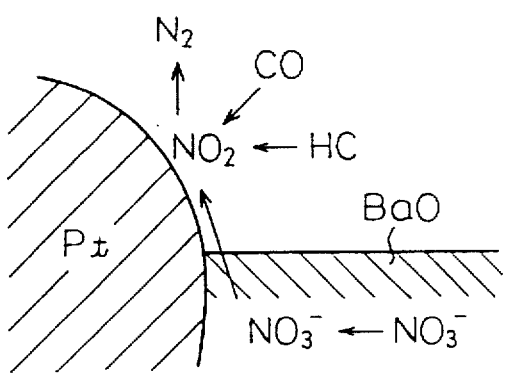
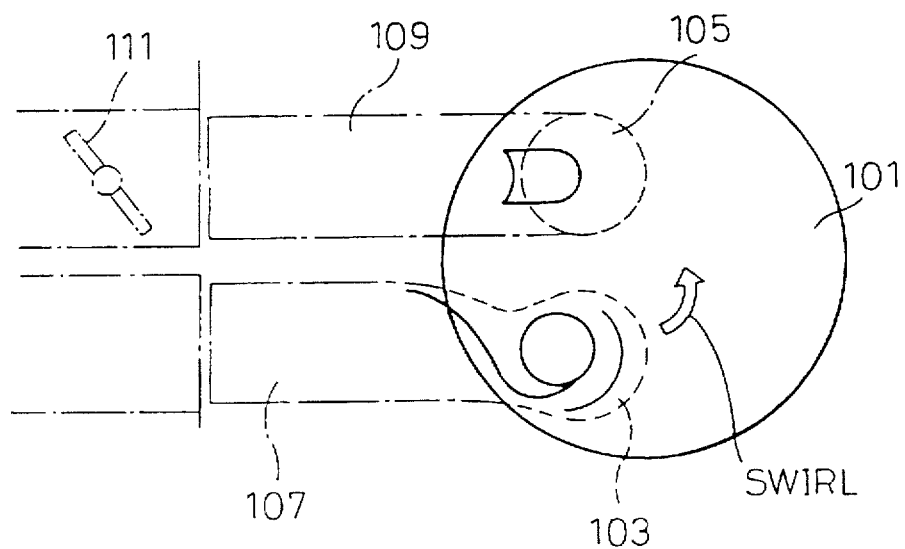

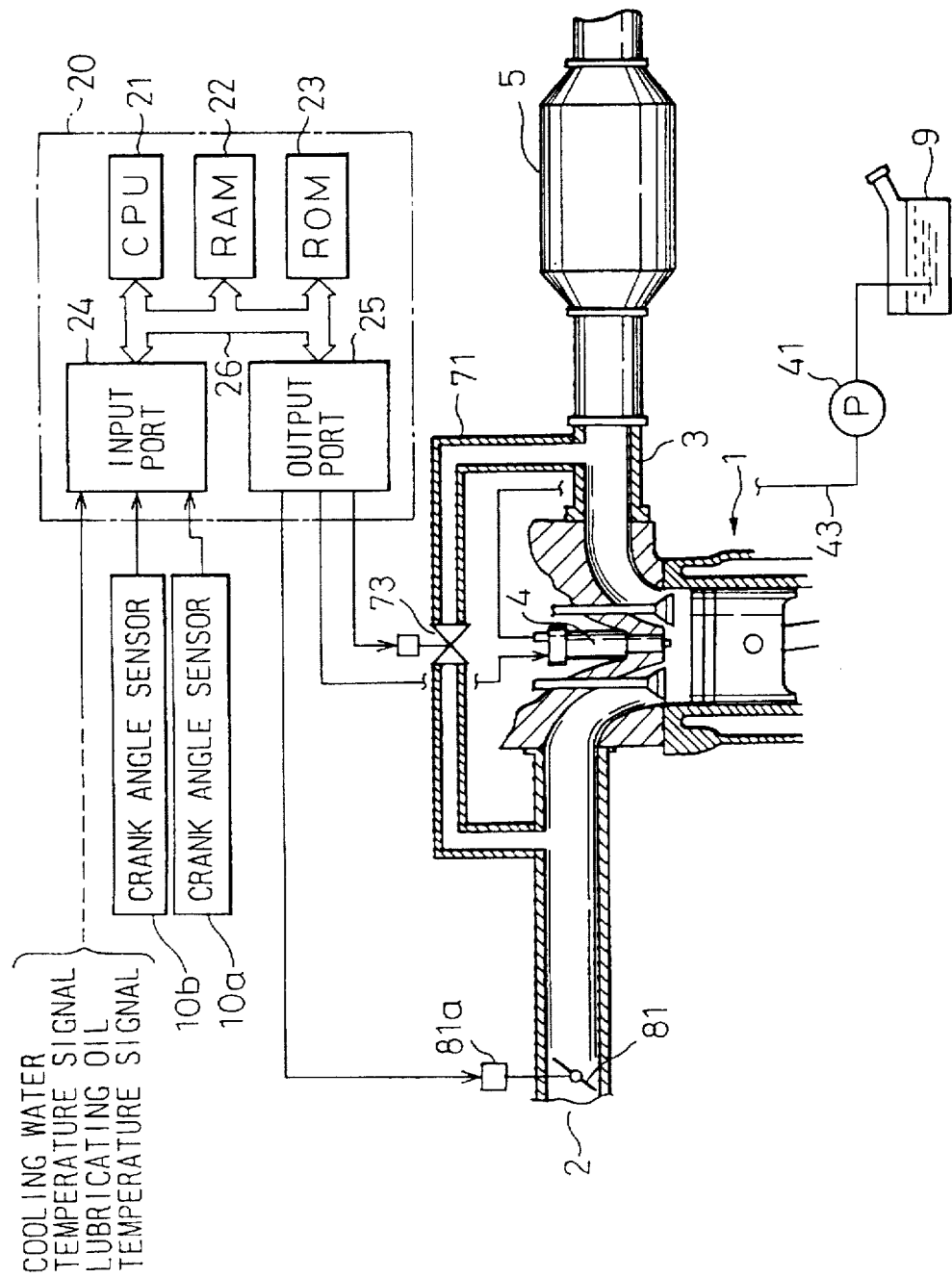

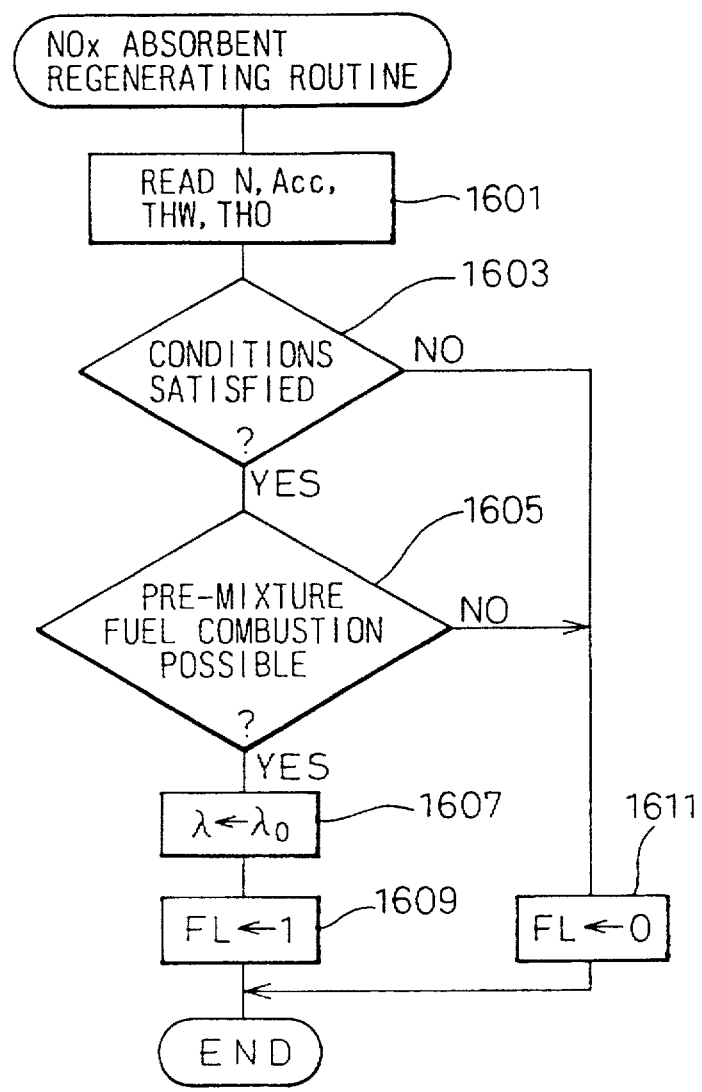

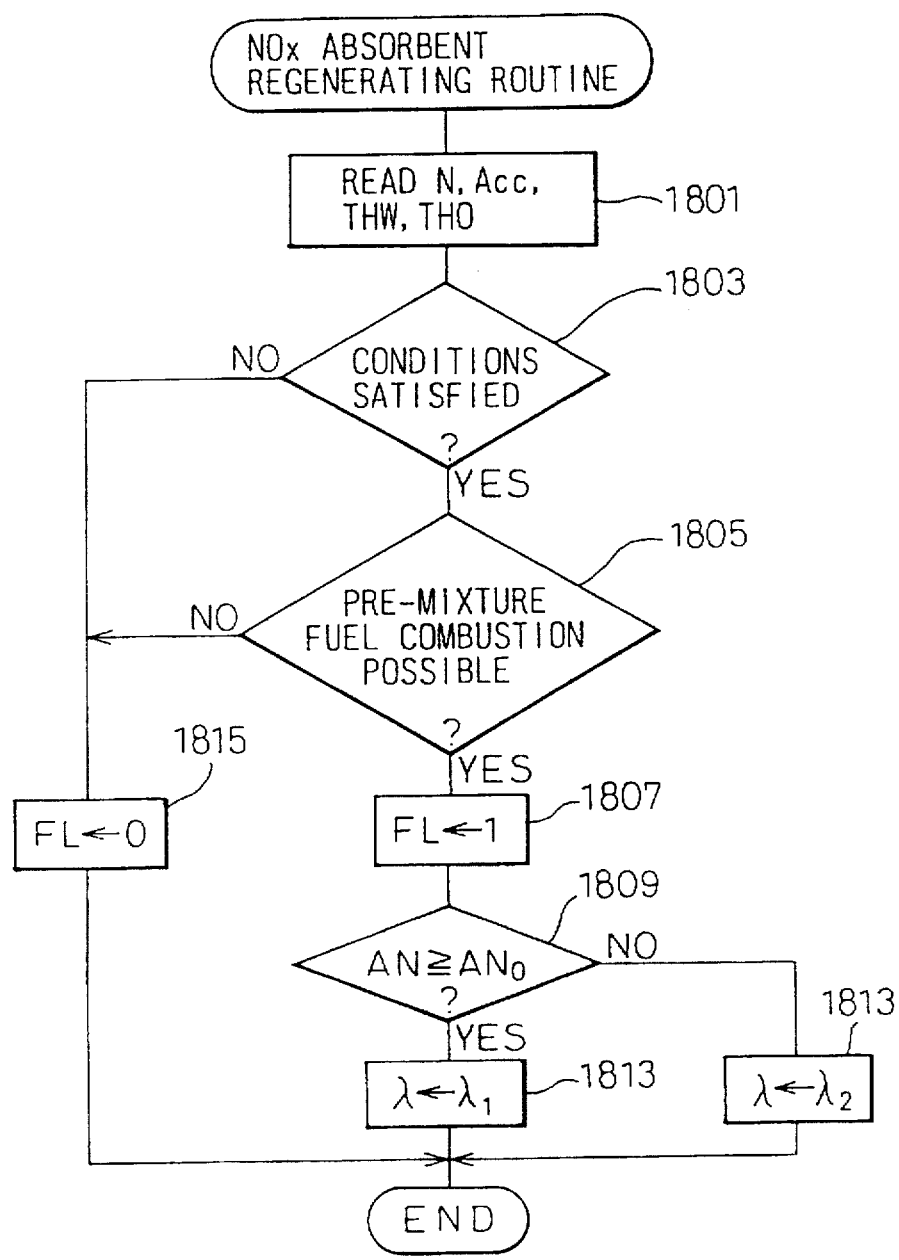

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine, and more specifically it relates to an exhaust gas purification device which can effectively remove $NO_x$ from the exhaust gas from a compression-firing internal combustion engine such as a diesel engine.

2. Description of the Related Art

An exhaust gas purification device which can remove $NO_x$ from the exhaust gas of an internal combustion engine is disclosed in international patent publication WO93-7363. In the exhaust gas purification device disclosed in the '363 publication, a $NO_x$ absorbent is disposed in an exhaust gas passage of the internal combustion engine. The $NO_x$ absorbent absorbs $NO_x$ in the exhaust gas when the air-fuel ratio of the exhaust gas flowing into the $NO_x$ absorbent is lean (i.e., the air-fuel ratio of the exhaust gas is higher than the stoichiometric air-fuel ratio), and releases the absorbed $NO_x$ when the oxygen concentration of the exhaust gas flowing into the $NO_x$ absorbent drops. In the normal operation, the engine in the '363 publication is operated at a lean air-fuel ratio and the air-fuel ratio of the exhaust gas from the engine becomes lean, thereby $NO_x$ in the exhaust gas is absorbed by the $NO_x$ absorbent. When the operation of the engine at a lean air-fuel ratio continues a certain period, the amount of $NO_x$ absorbed in the $NO_x$ absorbent increases, and the $NO_x$ absorbing capacity of the $NO_x$ absorbent drops. Therefore, in the '363 publication, the operating air-fuel ratio of the engine is switched from a lean air-fuel ratio to a rich air-fuel ratio after the lean air-fuel ratio operation of the engine continues for a predetermined time. By operating the engine at a rich air-fuel ratio for a short time, the oxygen concentration of the exhaust gas from the engine becomes low, thereby the $NO_x$ absorbed by the $NO_x$ absorbent is released and reduced to $N_2$ by unburned HC and CO contained in the rich air-fuel ratio exhaust gas. (In this specification, the operation of releasing absorbed $NO_x$ from the $NO_x$ absorbent and reduction thereof is called "regenerating operation of $NO_x$ absorbent"). By regenerating the $NO_x$ absorbent periodically in this manner, the $NO_x$ absorbing capacity of the $NO_x$ absorbent is restored, thereby the $NO_x$ absorbent can maintain an exhaust gas purification capacity at high level.

When the $NO_x$ absorbent as explained above is used for removing $NO_x$ in the exhaust gas, it is necessary to regenerate the $NO_x$ absorbent periodically, to prevent the saturation of the absorbent with $NO_x$. In the exhaust gas purification device of the '363 publication, since a spark-ignited internal combustion engine is used, the $NO_x$ absorbent can be regenerated by periodically changing the operating air-fuel ratio of the engine from lean to rich or to a stoichiometric air-fuel ratio for a short period.

However, a problem arises when the above-noted exhaust gas purification device using a $NO_x$ absorbent is applied to a diesel engine. In a diesel engine, the mode of the combustion in the combustion chamber is mainly a diffusive combustion and the excess air ratio of the engine is very high, i.e., the operating air-fuel ratio of the engine is much higher than the stoichiometric air-fuel ratio. Therefore, in case of a diesel engine, it is necessary to reduce an excess air ratio of the engine by greatly increasing the amount of fuel injected into the cylinder in order to regenerate the $NO_x$ absorbent. However, if the amount of fuel injection is increased when a diesel engine is operated in operation mode in which diffusive combustion is dominant, a large part of the added fuel remains unburned, and this causes the generation of smoke in the exhaust gas. In this case, the added fuel does not contribute to reduce the concentration of oxygen in the exhaust gas at all and, further, the large amount of smoke generated by the unburned fuel attaches to the surface of the $NO_x$ absorbent and lowers the capability of the $NO_x$ absorbent for absorbing $NO_x$ in the exhaust gas.

In the normal operation of a diesel engine, fuel is injected into the compressed, high-temperature air in a combustion chamber, and the mode of combustion in the combustion chamber is mainly a diffusive combustion in which combustion occurs only in the combustible gas mixture layer of vaporized fuel and air formed at the boundary between the injected fuel and the surrounding compressed air in the combustion chamber. For this reason, when the amount of injected fuel is greatly increased, there is an increase in the amount of fuel of the injected fuel which is not vaporized and which remains as fluid droplets. These droplets of fuel which are exposed to high temperature and high pressure without contacting the surrounding air, tend to form carbon particles (i.e., smoke particles) without burning. Therefore, if the amount of fuel is increased greatly during diffusive combustion, a large portion of the increased fuel is exhausted as carbon particles (smoke).

SUMMARY OF THE INVENTION

In view of the problems in the related art, the object of the present invention is to provide an exhaust gas purification device which is capable of regenerating a $NO_x$ absorbent by operating a diesel engine at a low excess air ratio, without generating a large amount of smoke.

The above object is achieved by an exhaust gas purification device according to the present invention. In the present invention, the exhaust gas purification device is applied to a compression-firing internal combustion engine equipped with a direct cylinder fuel injection valve which injects fuel directly into a combustion chamber of the engine. The exhaust gas purification device comprises, a $NO_x$ absorbent which is disposed in an exhaust gas passage of an engine, and which absorbs $NO_x$ in an inflowing exhaust gas when the air-fuel ratio of the exhaust gas flowing into the $NO_x$ absorbent is lean and releases absorbed $NO_x$ when the oxygen concentration of the inflowing exhaust gas is lowered, excess air ratio reducing means for reducing the excess air ratio of the engine when the $NO_x$ absorbent is to release the absorbed $NO_x$, thereby reducing the oxygen concentration of the exhaust gas flowing into the $NO_x$ absorbent, and combustion control means for controlling combustion of the engine, when the excess air ratio reducing means reduces the excess air ratio of the engine, in such a manner that the amount of the fuel injected from the direct cylinder fuel injection valve which contributes to pre-mixture fuel combustion in the combustion chamber is increased with respect to the amount of the fuel injected from the fuel injection valve which contributes to a diffusive combustion in the combustion chamber.

In the normal operation of a compression-firing internal combustion engine such as a diesel engine, the time between the fuel injection and firing of the injected fuel is very short, i.e., there is not sufficient time for the injected fuel to form a combustible air-fuel pre-mixture. Therefore, in the normal operation of a diesel engine, pre-mixture fuel combustion hardly ever occurs in the combustion chamber, and diffusive combustion becomes dominant in the combustion chamber.

In the exhaust gas purification device in the present invention, when the excess air ratio is reduced by the excess air ratio reducing means, the combustion control means increases the amount of fuel which contributes to pre-mixture fuel combustion in the combustion chamber with respect to the amount of fuel which contributes to diffusive combustion in the combustion chamber. Namely, in the present invention, the amount of fuel which forms combustible air-fuel pre-mixture between the time at which fuel injection is started and the time at which firing of the injected fuel starts is increased when the excess air ratio is reduced by the combustion control means. Therefore, when the excess air ratio of the diesel engine is reduced, pre-mixture fuel combustion becomes dominant in the combustion chamber. Since the injected fuel vaporizes and mixes with surrounding air in the combustion chamber before the firing of fuel starts in pre-mixture fuel combustion, the fuel injected into the combustion chamber burns without forming carbon particles. Therefore, the operation of a diesel engine in a reduced excess air ratio is achieved without increased smoke in the exhaust gas.

BRIEF DESCRIPTION OF THE DRAWINGS

The present invention will be better understood from the description, as set forth hereinafter with reference to the accompanying drawings in which:

FIGS. 3A and 3B are drawings which illustrate the mechanism of the absorbing and releasing operation of $NO_x$ of the $NO_x$ absorbent;

FIG. 4 is a drawing which illustrates means for generating a swirl inside a cylinder;

FIG. 5 is a drawing schematically illustrating another embodiment of the present invention;

FIG. 16 is a flowchart illustrating an example of the control of regenerating operation of a $NO_x$ absorbent;

FIG. 18 is a flowchart illustrating an example of the control of regenerating operation of a $NO_x$ absorbent.

DESCRIPTION OF THE PREFERRED EMBODIMENT

An embodiment of the present invention will be described below, with reference being made to the relevant accompanying drawings.

Figure 1:
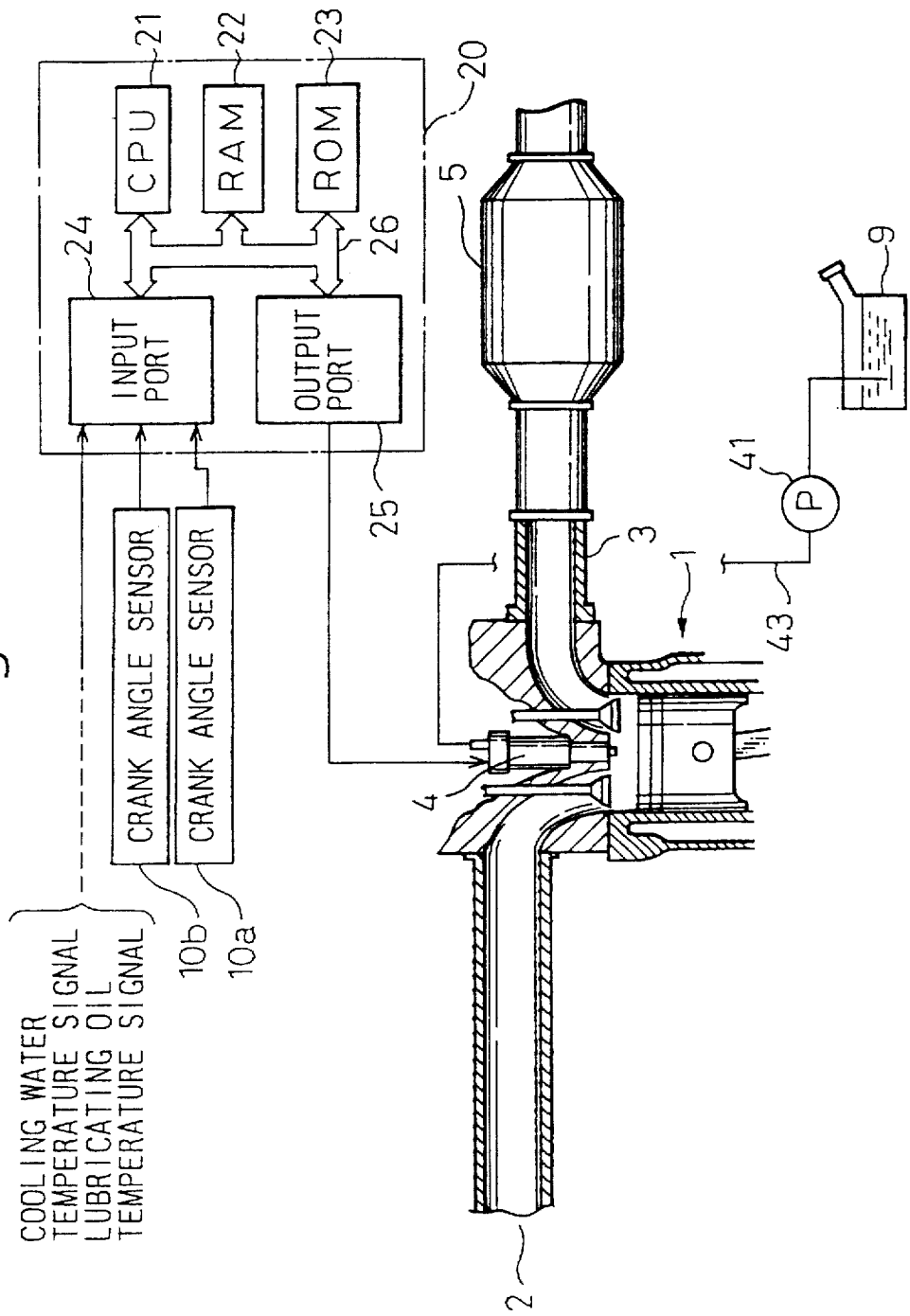
FIG. 1 is a drawing schematically illustrating an embodiment of the exhaust gas purification device according to the present invention when applied to a diesel engine of an automobile.

FIG. 1 shows a simplified configuration of a diesel engine to which an exhaust gas purification device according to the present invention is applied. In FIG. 1, the reference numeral 1 denotes a diesel engine (of which the cross-section of only one cylinder is shown in FIG. 1), 2 is an intake manifold of the engine 1, and 3 is an exhaust gas passage. Further, in FIG. 1, numeral 4 denotes a direct cylinder fuel injection valve, which injects fuel directly into a combustion chamber of the engine 1, 9 is a fuel tank, 41 is a feed pump which supplies fuel oil from the fuel tank 9 to the fuel injection valve 4 of the respective cylinders, and 43 is a fuel line (common rail) which connects the feed pump 41 and the fuel-injection valve 4 of the respective cylinders.

In this embodiment, the direct cylinder fuel injection valve 4 is an electromagnetic valve, and the timing and amount of fuel injection of the injection valve 4 can be directly controlled by an engine control circuit 20, to be described later.

Figure 2:
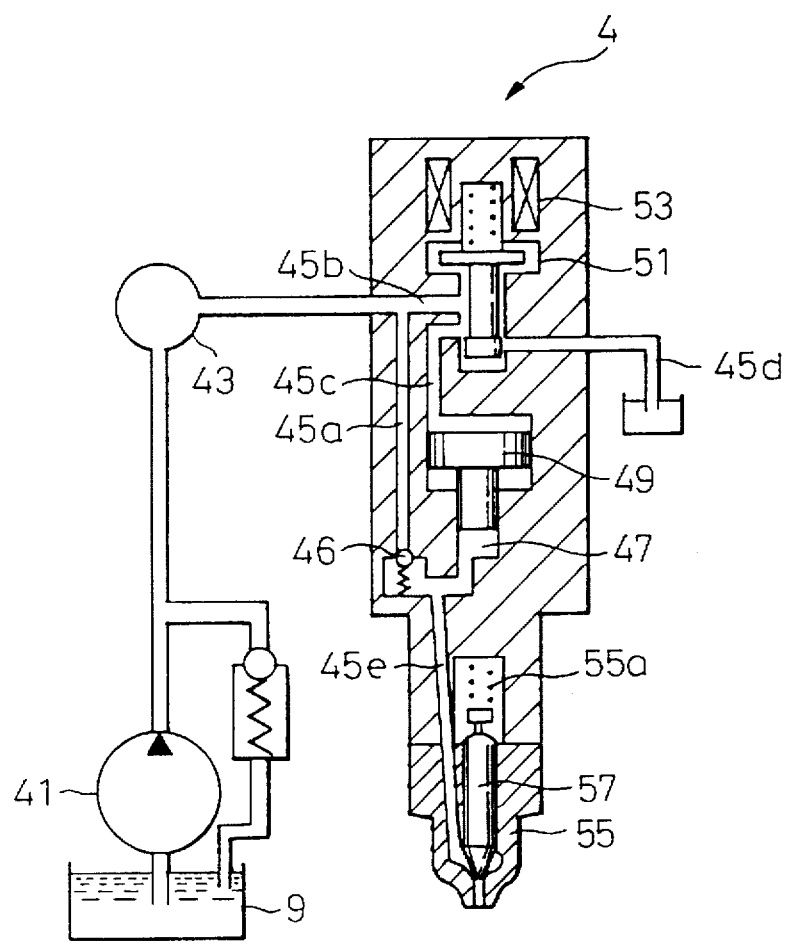
FIG. 2 is a drawing which illustrates the operating principle of the direct cylinder fuel injection valve used in the embodiment in FIG. 1.

FIG. 2 shows the construction and the operating principle of the direct cylinder fuel injection valve 4 in this embodiment.

In FIG. 2, the feed pump 41 is a high-pressure pump such as a high-pressure diaphragm pump or plunger pump which is, for example, mechanically driven by the engine 1. The fuel oil, the pressure of which has been raised by the feed pump 41, is pressure fed through the common rail 43 which connects the feed pump 41 to each of the direct cylinder fuel injection valves 4. The fuel oil inside the common rail 43 is led to the under side of the pressure piston 49 via the check valve 46, by means of the fuel path 45a inside the direct cylinder fuel injection valve 4.

The common rail 43 is connected to a three-way electromagnetic valve 51 of the direct cylinder fuel injection valve 4, by means of the fuel path 45b. The three-way electromagnetic valve 51 has a solenoid actuator 53, and when the solenoid actuator 53 is electrically energized, the common rail 43 is connected via the fuel path 45c to the upper side of the pressure piston 49 in the pressure chamber 47. When the solenoid actuator 53 is de-energized, however, the fuel path 45c is connected to the leak pipe 45d.

When the solenoid actuator 53 is energized, the three-way electromagnetic valve directs fuel oil inside the common rail 43 to the upper side of the pressure piston 49. The pressure piston 49 has its upper pressure-receiving surface area set to be larger than the area of its lower part. Because the fuel oil inside the pressure chamber 47 is prevented from backflowing into the common rail 43 by the check valve 46, the pressure of the fuel oil imposed on the upper side of the pressure piston 49 causes downward movement of the pressure piston 49 which results in a further increase in pressure of the fuel oil in the pressure chamber under the piston 49. That is, the fuel supplied by the common rail 43 is further pressurized by the pressure piston 49. The pressure chamber 47 is connected via the fuel path 47e to the fuel-injection nozzle 55, and when the fuel pressure in the pressure chamber 47 exceeds a predetermined valve-opening pressure, the fuel in the pressure chamber 47 moves the valve body 57 upward against the force of the spring 55a, and thereby, the fuel in the pressure chamber 47 is injected into the combustion chamber through the nozzle 55.

When the solenoid actuator 53 of the three-way valve 51 is de-energized, the fuel path 45c is connected to the leak pipe 45d, and the fuel oil pressure acting on the upper side of the pressure piston 49 is relieved through the leak pipe 45d and the fuel oil upper side of the piston 49 is exhausted to the fuel tank through the pipe 45d. Therefore, the fuel oil pressure in the pressure chamber 47 is reduced, and the fuel injection from the nozzle 55 is terminated, and also fuel oil flows into the pressure chamber 47 from the common rail 43 through the fuel path 45a and the check valve 46.

As described above, in a direct cylinder fuel injection valve 4 in this embodiment, the timing and the amount of fuel injection can be controlled arbitrary by adjusting the timing and the length of the electrical energizing of the solenoid actuator 53.

Next, returning to FIG. 1, the reference numeral 5 in FIG. 1 designates an $NO_x$ absorbent disposed in the exhaust gas passage 3 of the engine 1. The $NO_x$ absorbent 5 performs an absorbing and releasing operation of $NO_x$ in which the $NO_x$ absorbent absorbs $NO_x$ in the exhaust gas when air-fuel ratio of the exhaust gas is lean, and releases absorbed $NO_x$ when the oxygen concentration in the exhaust gas drops. This absorbing and releasing operation of $NO_x$ absorbent is explained later in detail.

In FIG. 1, the reference numeral 20 denotes an engine control circuit (ECU, engine control unit). The ECU 20 is constructed as a conventional digital computer having a central processing unit (CPU) 21, a random access memory (RAM) 22, a read-only memory (ROM) 23, an input port 24 and an output port 25 connected by a bi-directional bus 26 to each other. The ECU 21 performs basic control such as fuel injection amount control and fuel injection timing control of the engine 1, and in this embodiment, also lowers the air excess ratio of the engine when regenerating the $NO_x$ absorbent 5 by switching the operation mode of the engine 1 from the mode in which diffusive combustion is dominant to the mode in which the pre-mixture fuel combustion is dominant as explained later.

For the purpose of performing these types of control, pulse signals are supplied to the input port 24 of the ECU 20 from crank angle sensor 10a provided on the crankshaft (not shown in the drawing) of the engine 1 which generates pulse signal at each given rotation angle of the crankshaft, and from another crank angle sensor 10b which is also provided on the crankshaft and generates a reference pulse signal each time the crankshaft of the engine 1 reaches a reference position (for example, the top dead center of the first cylinder). In addition, to input port 24, signals representing the degree of depressing of accelerator pedal, the cooling water temperature, and the engine lubricating oil temperature, are supplied from the corresponding sensors (not shown in the drawing). The pulse signal from the crank angle sensor 10a is used for the calculation of, for example, the engine rotation speed, and the pulse signal from the crank angle sensor 10b is used in control of the timing of fuel injection from the direct cylinder fuel injection valve 4.

The output port 25 of the ECU 20 is connected, via a drive circuit (not shown in the drawing) to the three-way electromagnetic valve 51 of each direct cylinder fuel injection valve 4 of the engine 1, in order to control the amount and timing of fuel injection from the fuel-injection valves 4.

Next, the $NO_x$ absorbent 5 used in the present invention will be explained.

The $NO_x$ absorbent 5 uses a carrier made of, for example, alumina, this carrier supporting precious metals such as platinum (Pt), and at least one substance selected, for example, from alkaline metals such as potassium (K), sodium (Na), lithium (Li), and cesium (Cs), alkaline earth metals such as barium (Ba) and calcium (Ca), and rare earth elements such as lanthanum (La) and yttrium (Y). The $NO_x$ absorbent 5 absorbs $NO_x$ in the exhaust gas when the air-fuel ratio of the exhaust gas flowing through the $NO_x$ absorbent is lean, and releases the absorbed $NO_x$ when the oxygen concentration in the exhaust gas drops. In this specification, the term "air-fuel ratio of the exhaust gas" means a ratio of the air and the fuel which are supplied to the engine or exhaust passages upstream of the $NO_x$ absorbent. Therefore, when no air and fuel is supplied in the exhaust passages upstream of the $NO_x$ absorbent 5, the air-fuel ratio of the exhaust gas becomes the same as the operating air-fuel ratio of the engine (i.e., the air-fuel ratio of the air-fuel mixture supplied to combustion chambers of the engine). Since a diesel engine is used in this embodiment, the air-fuel ratio of the exhaust gas during the normal operation of the engine is lean, and the $NO_x$ absorbent 5 absorbs $NO_x$ in the exhaust gas. Further, as explained later, when the excess air ratio of the engine is lowered, the air-fuel ratio of the exhaust gas becomes rich and the oxygen concentration in the exhaust gas becomes low. In such a condition the $NO_x$ absorbent 5 releases the absorbed $NO_x$.

Though the mechanism of this absorbing and releasing operation of the $NO_x$ absorbent is not clear, it is thought that the absorbing and releasing operation is conducted by the mechanism shown in FIGS. 3A and 3B. FIGS. 3A and 3B explain the mechanism of the absorbing and releasing operation in the case where platinum Pt and barium Ba are carried on the carrier, as an example, but it is thought that a similar mechanism also applies even if other precious metals, alkali metals, alkali earth metals, or rare earth metals are used.

Namely, when the air-fuel ratio of the exhaust gas flowing into the $NO_x$ absorbent is lean, the concentration of oxygen in the exhaust gas is relatively high. In this case, as shown in FIG. 3A, the oxygen $O_2$ is deposited on the surface of platinum Pt in the form of $O_{2-}$ or $O^{2-}$. The NO in the exhaust gas reacts with $O_{2-}$ or $O^{2-}$ on the surface of the platinum Pt and becomes $NO_2$ ($2NO+O_2 \rightarrow 2NO_2$). Then, a part of the produced $NO_2$ is oxidized on the platinum Pt and absorbed into the $NO_x$ absorbent. While bonding with the barium oxide BaO, it is diffused in the absorbent in the form of nitric acid ions $NO_{3-}$ as shown in FIG. 3A. In this way, $NO_x$ is absorbed in the $NO_x$ absorbent. As long as the oxygen concentration in the exhaust gas is high, the $NO_x$ is produced on the surface of the platinum Pt, and as long as the $NO_x$ is produced on the surface of the platinum Pt, and as long as the $NO_x$ absorbing capacity of the absorbent is not saturated by the absorbed $NO_x$, the $NO_x$ is absorbed into the $NO_x$ absorbent and nitric acid ions $NO_{3-}$ are produced.

On the other hand, when the operating excess air ratio of the engine is lowered, i.e., when the air-fuel ratio of the exhaust gas becomes rich or a stoichiometric air-fuel ratio, the oxygen concentration in the exhaust gas flowing into the $NO_x$ absorbent is lowered. This causes the production of $NO_2$ to be lowered, and the reaction proceeds in an inverse direction ($NO_3 \rightarrow NO_2$), and thus nitric acid ions $NO_3-$ to in the absorbent are released in the form of $NO_2$ from the $NO_x$ absorbent.

In this case, if the components such as HC, CO exist in the exhaust gas, these components react with the oxygen $O_2$ in the exhaust gas and oxygen $O_2-$ or $O^{2-}$, on the platinum Pt and are oxidized. By this oxidation of the HC, CO components, the oxygen component existing near the $NO_x$ absorbent is consumed, and the concentration of oxygen in the atmosphere around the $NO_x$ absorbent is lowered. Also, the $NO_2$ released from the $NO_x$ absorbent reacts with the HC and CO components in the exhaust gas as shown in FIG. 3B and is reduced to $N_2$. In this way, when the $NO_2$ on the surface of the platinum Pt reacts with HC and CO in the exhaust gas, and when the $NO_2$ no longer exists on the surface of the platinum Pt, the $NO_2$ is successively released from the absorbent.

Accordingly, if components such as HC, CO exist in the exhaust gas, the $NO_x$ is released from the $NO_x$ absorbent and reduced to $N_2$ in a short time.

Namely, the HC and CO components in the exhaust gas flowing into $NO_x$ absorbent immediately react with the $O_2^-$ or $O^{2-}$ on the platinum Pt and are oxidized and, subsequently, if the HC and CO still remain after the $O_2^-$ or $O^{2-}$ on the platinum Pt are consumed, the $NO_x$ released from the absorbent is reduced to $N_2$. Since CO has a high reducing capability, when the concentration of CO in the exhaust gas is high, the releasing and reduction of the absorbed $NO_x$ is performed in a short time.

In this embodiment, during the regenerating operation of the $NO_x$ absorbent 5, the engine 1 is operated so that its excess air ratio ($\lambda$) of combustion is reduced to 1.0 or lower. By doing this, the engine 1 is operated with a rich air-fuel ratio. When operating under the condition $\lambda \leq 1.0$, the oxygen concentration in the exhaust gas decreases sharply, and unburned HC and CO in the exhaust gas increases. Thus, $NO_x$ absorbed in the $NO_x$ absorbent 5 during the normal operation of the engine 1 is released from the $NO_x$ absorbent 5 and reduced to $N_2$ and, thereby, $NO_x$ in the exhaust gas is purified.

Operation of the engine 1 with a reduced excess air ratio in this embodiment is now explained.

In this embodiment, because a diesel engine is used, in normal operation (that is, operation when regeneration of the $NO_x$ absorbent 5 is not being done), the main mode of the combustion in the combustion chamber of the diesel engine is diffusive combustion, in which the excess air ratio is large. In diffusive combustion, fuel is injected into the combustion chamber in the latter half of the compression stroke, i.e., fuel is injected into the compressed high temperature air in the combustion chamber. Then the injected fuel begins to burn in the combustible gas mixture layer of vaporized fuel and air formed at the boundary between the injected fuel and the surrounding compressed air. That is, in diffusive combustion, the injected fuel and surrounding air are separated by a flame formed therebetween.

For this reason, if operation at a low excess air ratio such as $\lambda \leq 1.0$ is performed while maintaining this diffusive combustion, a large part of the injected fuel is not vaporized, does not contact with the air, and is exposed to the flames of combustion at the combustible gas mixture layer, thereby generating carbon particles rather than being combusted.

Therefore, if an operation is performed at $\lambda \leq 1.0$ while maintaining diffusive combustion, the amount of smoke in the exhaust gas increases, without causing a large decrease in the oxygen concentration in the exhaust gas.

In this embodiment, to solve the above-noted problem, when operating with a reduced excess air ratio, the diesel engine 1 is forced to operate mainly on pre-mixture fuel combustion. In pre-mixture fuel combustion, fuel injected from the direct cylinder fuel injection valve 4 is diffused, vaporized, and mixed with air so that a combustible gas mixture is formed before combustion in the combustion chamber starts. For this reason, when combustion begins, the flame of combustion propagates through the combustion chamber, so that combustion occurs throughout the entire combustion chamber almost simultaneously. In the pre-mixture fuel combustion, in contrast to the diffusive combustion, since fuel is vaporized and is in contact with air when combustion starts, the generation of smoke is prevented, even if the excess air ratio is reduced.

In this embodiment, when performing regeneration of the $NO_x$ absorbent 5, the excess air ratio of the diesel engine is lowered and also the portion of the fuel contributes to pre-mixture fuel combustion is increased. Therefore, engine 1 is operated at low excess air ratio and pre-mixture fuel combustion becomes dominant in the combustion chamber of the engine 1 during the regenerating operation of the $NO_x$ absorbent 5, thus an exhaust gas having a low oxygen concentration is supplied to the $NO_x$ absorbent 5 without increasing the amount of smoke in the exhaust gas.

Next, the actual operation of operating the engine 1 mainly on pre-mixture fuel combustion is described below.

To cause the diesel engine 1 to perform pre-mixture fuel combustion, it is necessary to form an air-fuel pre-mixture within the cylinder before the compressed air in the compression stroke in the cylinder reaches the temperature at which firing of fuel occurs. In normal diesel engine operation, because the fuel is injected into the combustion chamber in the latter half of the compression stroke, the time between the beginning of fuel injection and the temperature of the compressed air reaching the firing temperature is extremely short. Therefore, in the normal operation of the engine 1, the amount of fuel injected into the combustion chamber before the temperature of the compressed air reaches the firing temperature is small, further, this fuel cannot form a combustible air-fuel pre-mixture in the combustion chamber. Consequently the proportion of combustible air-fuel pre-mixture in the combustion chamber when combustion starts is very small.

In this embodiment, in consideration of the above, the following methods are used to form a combustible air-fuel pre-mixture in the combustion chamber using the fuel injected from the direct cylinder fuel injection valve 4 before the combustion point of the fuel is reached.

The methods explained below can be used individually or in combinations of two or more.

(1) Formation of a combustible air-fuel pre-mixture by increasing the amount of fuel injected into the combustion chamber by the direct cylinder fuel injection valve 4 before reaching the combustion point of the fuel.

By increasing the amount of fuel injected into the combustion chamber by the direct cylinder fuel injection valve 4 before reaching the fuel combustion point, the amount of fuel which contributes to pre-mixture fuel combustion is increased. As a result, the amount of fuel which is used in the pre-mixture fuel combustion increases, so that the diesel engine 1 mainly performs pre-mixture fuel combustion. The specific methods of increasing the amount of fuel injected into the combustion chamber before the fuel combustion point is reached include (a) to advance the timing of fuel injection, and (b) to change the injection ratio of the fuel injection valve in such a manner that the injection ratio becomes large at the beginning of the fuel injection period and becomes small near the end of the fuel injection period.

Each of these methods are explained below in detail.

(a) To advance the timing of fuel injection.

In this embodiment, the control circuit 20 detects the stroke position of each cylinder based on the reference signal input from the crank angle sensor 10b and the crank angle signal from the crank angle sensor 10b, and generates a drive pulse signal to the three-way electromagnetic valve 51 of the direct cylinder fuel injection valve 4 of a cylinder which has arrived at the timing for the start of fuel injection, thereby causing the start of fuel injection.

Normally, fuel combustion is performed during the latter half of the combustion stroke, during which the air within the combustion chamber is compressed and exceeds the combustion temperature of the fuel. In this embodiment, when the $NO_x$ absorbent 5 is to be regenerated, the control circuit 20 advances the timing at which fuel injection starts in each cylinder, in comparison with the injection start timing during normal operation. By doing this, the amount of fuel injected into the combustion chamber before the temperature in the combustion chamber reaches the fuel combustion temperature is increased. Therefore, the amount of fuel which forms a combustible air-fuel pre-mixture before the combustion starts is increased. The larger the advance of the fuel injection start timing, the greater is the amount of fuel contributing to the pre-mixture fuel combustion. Therefore, by changing the amount of advance of the fuel injection timing, it is possible to control the relative proportions of pre-mixture fuel combustion and diffusive combustion.

(b) To change the injection ratio of the fuel injection valve.

As described by FIG. 2, when the three-way electromagnetic valve 51 of the direct cylinder fuel injection valve 4 (refer to FIG. 2) is switched to the position in which a connection is made between the fuel path 45c which communicates with the upper side of the pressure piston 49 and the common rail 43 (fuel path 45b), fuel oil pressure in the common rail 43 is guided to the upper side of the pressure piston 49 and, thereby, the fuel oil pressure in the pressure chamber 47 rises. When the three-way electromagnetic valve 51 is switched to the position in which the fuel path 45c is connected to the leak pipe 45d, the fuel oil pressure at the upper side of the pressure piston 49 is reduced and the fuel oil pressure within the pressure chamber 47. For this reason, it is possible to adjust the fuel oil pressure acting on the upper side of the pressure piston 49 by alternating the three-way electromagnetic valve 51 at a short interval to adjust the ratio of the time during which the upper side of the pressure piston 49 is connected to the common rail 43 to the time during which the upper side of the pressure piston 49 is connected to the leak pipe 45d, that is, to adjust the fuel oil pressure within the combustion chamber.

In this embodiment, the control circuit 20 drives the three-way electromagnetic valve 51 by means of a pulse signal, and the duty ratio of this pulse signal is changed to change the fuel oil pressure acting on the upper side of the pressure piston 49 in such a manner that the duty ratio becomes large at the start of fuel injection and becomes small in the latter part of the fuel injection. By doing this, the injection ratio (amount of fuel injected per unit time) is increased, so as to obtain a large injection pressure at the beginning of fuel injection and a small injection pressure in the latter part of the fuel injection. Therefore, since the injection ratio is reduced in the later part of the fuel injection, the amount of fuel injected into the combustion chamber in the beginning of the fuel injection is increased even if the amount of fuel and the fuel injection timing is the same.

By doing this, the amount of fuel injected into the combustion chamber before the start of the combustion of fuel is increased, thereby increasing the amount of fuel which contributes to pre-mixture fuel combustion.

(2) Formation of a combustible air-fuel pre-mixture by promoting the vaporization of fuel injected into the combustion chamber before the start of fuel combustion In normal diesel engine operation, fuel injected into the combustion chamber before firing of the fuel starts does not vaporize and remains in a liquid form. Therefore, only a very small part of the fuel forms a combustible air-fuel pre-mixture in the combustion chamber. This causes diffusive combustion to become dominant in the combustion chamber. Additionally, as described above, when fuel remaining in the liquid state is exposed to the flame of combustion, it forms carbon particles and increases the amount of smoke in the exhaust gas. If it is possible, however, to vaporize the fuel in the combustion chamber before reaching the fuel combustion point, the generation of a combustible pre-mixture of vaporized fuel and air can be promoted. This causes pre-mixture fuel combustion to become dominant in the combustion chamber, thereby preventing the generation of carbon particles from liquid-state fuel.

Specific methods used for promoting the vaporization of fuel include, for example (a) to advance the timing at which fuel injection starts, (b) to raise the temperature of the fuel oil, (c) to change the fuel injection pressure in accordance with the fuel injection timing, (d) to generate a swirl within the combustion chamber, and (e) to recirculate exhaust gas into the combustion chamber.

Each of these methods are explained below in detail.

(a) To advance the timing at which fuel injection starts.

As described above, by advancing the timing at which fuel injection starts, it is possible to increase the amount of fuel injected into the combustion chamber before reaching the fuel combustion point. This advance of the injection starting timing also promotes the vaporization of fuel. That is, by advancing the timing at which fuel injection starts, the time from fuel injection to combustion is increased, so that the injected fuel is sufficiently vaporized and diffused in the combustion chamber before the combustion temperature is reached and, thereby, a combustible pre-mixture of fuel with the air is formed in the combustion chamber before combustion starts.

(b) To raise the temperature of the fuel oil.

By increasing the temperature of the fuel oil injected into the combustion chamber, it is possible to promote the vaporization of the fuel. To accomplish this, an electric heater, for example, may be provided on the fuel supply piping to heat the fuel oil supplied to the direct cylinder fuel injection valve 4.

(c) To change the fuel injection pressure in accordance with the fuel injection timing.

In normal operation, part of the fuel injected from the direct cylinder fuel injection valve 4 collides with the top surface of the piston, which has risen in the compression stroke and is atomized by the collision. However, the remaining part of the injected fuel attaches to the cylinder liner without colliding with the piston surface and forms relatively large liquid droplets. Since the size of liquid droplets is relatively large, the fuel attached to the cylinder liner is not easy to evaporate to form a combustible air-fuel pre-mixture.

As explained before, in this embodiment, the fuel injection pressure of the direct cylinder fuel injection valve 4 can be changed by changing the duty ratio of the drive pulse of the three-way electromagnetic valve 51. In this embodiment, the fuel injection pressure is changed in accordance with the fuel injection timing, as described below, in order to reduce the amount of the fuel attached to the cylinder liner, thereby promoting the vaporization of the injected fuel.

For example, in the case in which fuel injection is done on the compression stroke, the fuel injection pressure can be increased to higher than the pressure in the normal operation. By doing this, the penetrating power of the injected fuel is increased, thereby increasing the amount of fuel that directly collides with the top surface the piston, causing a reduction in the amount of fuel which attaches to the liner. Because the fuel which collides with the top surface of the piston is finely dispersed, the vaporization and diffusion thereof is promoted.

When the timing of fuel injection is advanced, i.e., when fuel injection is done during the intake stroke, it is not possible to cause the injected fuel to collide with the top surface of the piston since the piston is in a lower position in the cylinder. Further, if the timing of fuel injection is advanced in such a manner that the fuel is injected during the intake stroke, the fuel is injected when the pressure in the cylinder is low. Therefore, if the fuel is injected with the normal fuel injection pressure also in this case, the velocity of the fuel injected from the fuel injection valve becomes excessively large. This causes a large part of the injected fuel to collide with the cylinder liner and to attach thereto. For this reason, the fuel injection pressure is lowered in this embodiment when the timing for fuel injection is advanced. By lowering the fuel injection pressure, a large part of the injected fuel mixes with the air in the cylinder and does not reach the cylinder liner even if the timing of fuel injection is advanced, and the vaporization of the fuel the and the formation of pre-mixture can be promoted.

(d) To generate a swirl within the combustion chamber.

In an engine having an intake swirl port and swirl control valve, it is possible to promote the diffusion and vaporization of the injected fuel by generating a swirl of the intake air within the cylinder by the intake air flow through the intake swirl port. FIG. 4 is a simplified drawing which shows the configuration of a cylinder head in a diesel engine which has a swirl intake port and an intake control valve. In FIG. 4, the reference numeral 101 denotes the cylinder head, and 103 and 105 are two intake ports provided in the cylinder head 101. In this embodiment, the intake port 103 is a helical port which is formed so as to have a helical shape. The intake air flow through the helical port 103 generates a swirl in the cylinder which has a rotational velocity component perpendicular to the axis of the cylinder. The other intake port 105 is a normal straight port, the air from this intake port 105 flowing into the cylinder in a straight line. The intake ports 103, 105 are connected to the independent intake manifolds 107 and 109, respectively, and on the intake manifold 109 of the straight intake port 105, a swirl control valve 111 which opens and closes the intake manifold 109 is provided.

In this embodiment, during normal operation the swirl control valve 111 remains open. Therefore, a large part of the intake air flows into the cylinder from the straight intake port 105 having a flow resistance smaller than the swirl intake port 103, thus no swirl is generated within the cylinder. In contrast to this, during combustion mode in which pre-mixture fuel combustion is dominant, the swirl control valve 111 is closed and the intake manifold 109 is blocked. In this case, since intake air flows into the cylinder only through the helical port 103, a strong swirl is generated in the cylinder, and also the amount of air flowing into the cylinder is reduced. The fuel injected into the cylinder from the direct cylinder fuel injection valve 4 is agitated and mixed with intake air due to this swirl, so that not only is the vaporization of the mixed fuel promoted, but also a uniform combustible air-fuel pre-mixture is generated.

(e) To recirculate exhaust gas into the combustion chamber.

In order to vaporize the fuel injected before the fuel combustion starts, it is desirable that the temperature within the cylinder be as high as possible. However, in a case in which fuel is injected during the intake stroke, such as when the fuel injection timing is advanced, the temperature within the cylinder is relatively low, due to the cold intake air. In such a case, vaporization of the fuel in the cylinder can be promoted by injecting (recirculating) hot exhaust gas into the cylinder.

FIG. 5 is a drawing which shows the configuration of a diesel engine having an EGR apparatus which recirculates part of the exhaust gas into the cylinders via the intake manifold system. In FIG. 5, elements indicated by same reference numerals are the same as those in FIG. 1 and will not be explicitly described herein. In FIG. 5, the reference numeral 71 denotes an EGR passage which connects the exhaust gas passage 3 of the engine to the intake manifold 2, and 73 is an EGR valve which is provided in the EGR passage 71. The EGR valve 73 is, for example, a flow control valve having an appropriate actuator, such as a stepper motor or solenoid actuator. This EGR valve 73 is capable of controlling, in response to a pulse signal from the control circuit 20, the amount of exhaust gas which is recirculated from the exhaust gas passage 3 to the intake manifold 2 via the EGR passage 71.

In this embodiment, when performing pre-mixture fuel combustion, the control circuit increases the opening of the EGR valve 73, so that the amount of exhaust gas which is recirculated into the cylinder via the intake manifold 2 is increased. When the recirculation amount of the exhaust gas is increased, the temperature in the cylinder rises due to the hot exhaust gas flowing into the cylinder together with the intake air and, thereby, the vaporization of the fuel injected into the cylinder is promoted.

In FIG. 5, reference numeral 81 denotes an intake restriction valve which is provided in the intake manifold 2. The intake restriction valve 81 is equipped with an appropriate actuator 81a which may same type as the actuator of the EGR valve 71, and the opening of the valve 81 is controlled by a drive signal from the control circuit 20. During normal operation, the intake restriction valve 81 is fully opened, so that the intake flow via the intake manifold 2 is not hindered. However, under a predetermined conditions, as will be described later, the intake restriction valve 81 closes to a predetermined degree of opening in order to reduce the amount of intake air flowing through the intake manifold 2. The intake restriction valve 81 can be used for reducing the amount of the intake air when the EGR valve 73 causes the recirculation of the exhaust gas to thereby further increase the temperature within the combustion chamber.

(3) Formation of a combustible air-fuel pre-mixture by delaying the timing of fuel combustion.

It is also possible to increase the time from the start of fuel injection to the fuel combustion by delaying the timing of the combustion of fuel injected into the cylinder. Thus, in the same manner as in the above-described case which advances the timing of fuel injection, it is possible to form a combustible air-fuel pre-mixture in the cylinder by delaying the timing of fuel combustion.

Specific methods for delaying the combustion of the fuel include, (a) reducing the pressure within the cylinder during the compression stroke, and (b) reducing the temperature within the cylinder during the compression stroke.

Each of these methods is described below in detail.

(a) Reducing the pressure within the cylinder during the compression stroke.

Fuel which is injected into a cylinder begins combusting when the temperature of the air within the cylinder rises to the combustion temperature during the compression stroke. If the pressure within the cylinder during the compression stroke is reduced to lower than normal, the accompanying temperature rise is also reduced and, thereby, the timing at which the temperature of the air reaches the combustion temperature is delayed. Especially, for example, in the engine having an intake restriction valve 81, such as explained in FIG. 5, by closing the intake restriction valve 81, the amount of air which flows into the cylinder via the intake manifold 2 is reduced to less than the normal amount. This lowers the pressure within the cylinder during the compression stroke, thereby the temperature of the air in the cylinder during the compression stroke becomes lower. Therefore, the time for the temperature of the air in the cylinder to reach the fuel combustion temperature is delayed compared to the normal condition, and the start of the combustion can be delayed.

In addition to the above, in an engine having a supercharger for boosting the intake air pressure, it is possible to stop the operation of the supercharger in order to reduce the supercharging pressure to, thereby further reduce the pressure within the cylinder during the compression stroke.

Further, in an engine having a variable valve timing mechanism which is capable of changing the timing of the closing of the intake valve, the effective compression ratio of the cylinder can be reduced by delaying the closing timing of the intake valve until after the start of the compression stroke to, thereby lower the pressure within the cylinder during the compression stroke.

In addition, in an engine having a variable compression ratio mechanism such as, for example, a variable-capacity pressure chamber which communicates with the cylinders, and is equipped with a piston which slides therein, it is possible to lower the effective compression ratio of the cylinder to reduce the compression pressure of the cylinder, by sliding the piston in the variable-capacity pressure chamber in such a manner that the capacity of the chamber increases.

(b) Reducing the temperature within the cylinder during the compression stroke.

During the compression stroke, instead of reducing the pressure, if the temperature within the cylinder is directly reduced, it is possible to delay the combustion of fuel. The specific methods for doing this include that of, for example, providing a cooler in the intake manifold, to lower the temperature of the in-take air. In particular, in the case of normal operation of a supercharged engine, since the temperature of the intake air is high due to supercharging, an effective method to reduce the temperature of the intake air is to stop the operation of the supercharger.

The foregoing was a description of methods of generating a combustible pre-mixture of fuel injected into the cylinder and air before the start of combustion, and while the above-mentioned methods can be used to perform combustion which mainly consists of pre-mixture fuel combustion with low excess air ratio in a diesel engine without generating smoke, they are sometimes accompanied by other problems.

Specifically, in pre-mixture fuel combustion, since a combustible mixture of fuel and air is formed throughout the cylinder, once combustion is started, an explosion occurs in which the combustion proceeds extremely rapidly. For this reason, problems such as fluctuation of the engine output torque and knocking occur, due to combustion proceeding before the top dead center in the compression stroke.

In particular, in order to lower the excess air ratio of an engine, it is necessary to increase the amount of fuel injection. This sometimes causes the pressure in the cylinder to rise sharply due to explosive combustion and aggravate the torque fluctuation and knocking.

In this embodiment, the problem of torque fluctuation and knocking due to explosive combustion is solved by the following method.

Namely, the rapid increase of internal cylinder pressure due to explosive combustion becomes larger as the amount of fuel increased in the pre-mixture fuel combustion, that is the load on the engine becomes larger. In other words, when the amount of fuel in the pre-mixture fuel combustion is small, there is little torque fluctuation or knocking even if explosive combustion occurs. Namely, when the load on the engine is small, i.e., when the amount of fuel injected into the cylinder is small, the influence of the explosive combustion on the actual engine operation, if any, is negligible. In this embodiment, pre-mixture fuel combustion with a reduced excess air ratio is performed only within a low load operation range of the engine in which the influence of explosive combustion on operation is negligible.

Figure 6A:
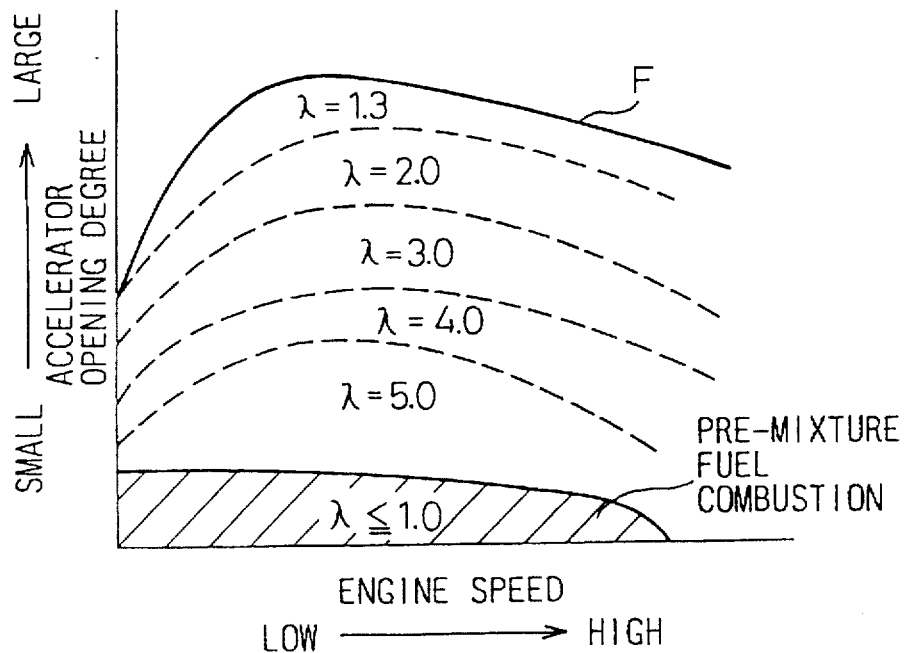
FIGS. 6A and 6B are drawings illustrating examples of the setting of load ranges in which pre-mixture fuel combustion is performed.

FIG. 6A shows an example of the load range of the engine within which pre-mixture fuel combustion is performed with a reduced excess air ratio in this embodiment. In FIG. 6A, the vertical axis represents the accelerator degree of opening (i.e., the amount of depressing of the accelerator pedal by the driver of the vehicle), that is, the engine output torque, while the horizontal axis represents the engine speed. The hatched area in this drawing represents the load range in which pre-mixture fuel combustion is performed in this embodiment. The solid line F in this drawing shows the output characteristics of the engine at full load, while the broken lines show the engine characteristics in the normal operating region as the excess air ratio $\lambda$ is varied. As can be seen from FIG. 6A, in normal operation, the excess air ratio $\lambda$ becomes larger as the load on the engine becomes larger. In the embodiment in FIG. 6A, when the operating load on the engine is in the range indicated by the hatched area, any one of the above-described methods is used to form a combustible air-fuel pre-mixture in the cylinder while reducing the excess air ratio $\lambda$ to 1.0 or lower.

Figure 6B:
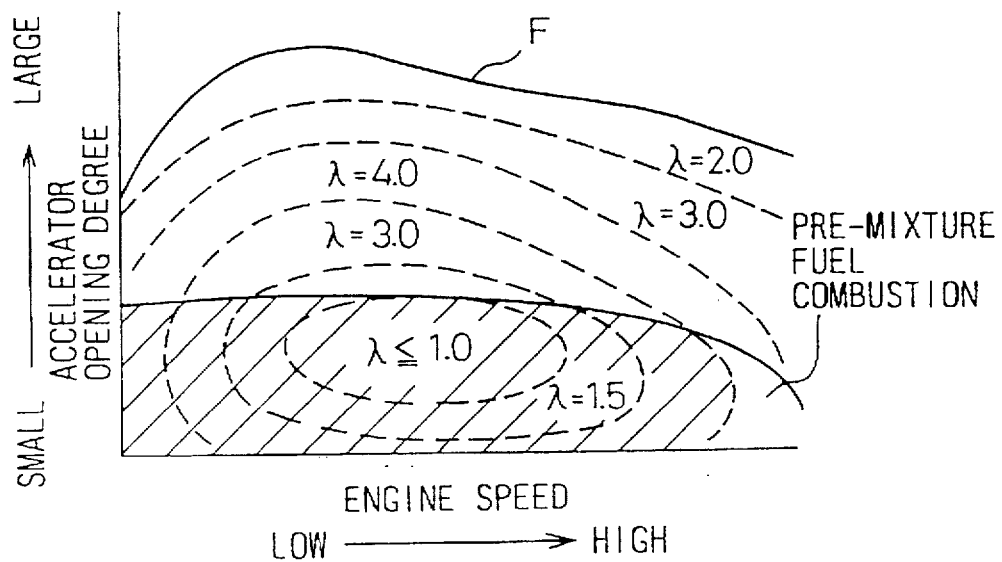

In the example shown in FIG. 6A, when the load on the engine is decreased from a higher load range to the load range shown by hatched area in FIG. 6A, the excess air ratio $\lambda$ is also switched from a higher value ($\lambda > 1.0$) to the reduced value ($\lambda \leq 1.0$) and the excess air ratio may be decreased gradually. FIG. 6B shows an example of the setting of the excess air ratio in which the excess air ratio takes intermediate values when the load on the engine decreases from higher load ($\lambda > 1.0$) to a low load ($\lambda \leq 1.0$) so that the excess air ratio decreases gradually. As seen from FIG. 6B, when the excess air ratio is to be reduced to the value less than or equal to 1.0, the excess air ratio in this embodiment is reduced gradually in accordance with the decrease in the engine load as indicated by the hatched area in FIG. 6B.

FIG. 7A through FIG. 10B show examples of the process of switching from diesel combustion mode (in which diffusive combustion is dominant) to combustion mode in which pre-mixture fuel combustion is dominant, in accordance with the load.

Figure 7A:
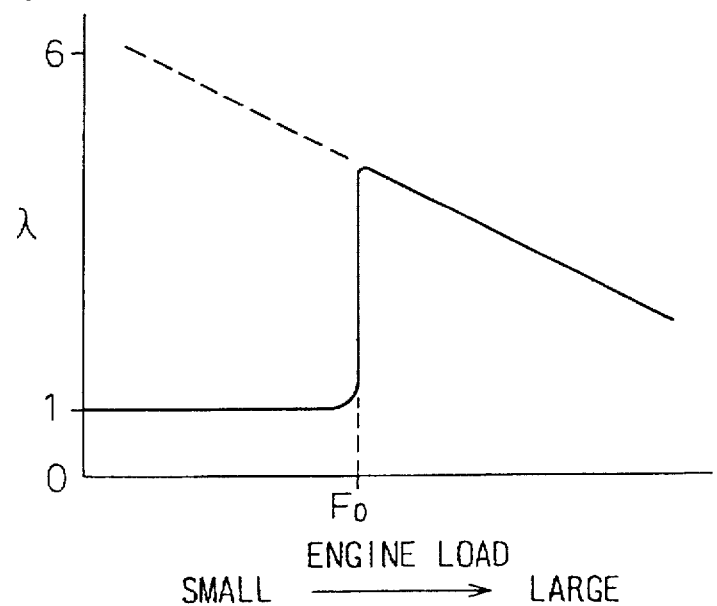
FIGS. 7A and 7B are drawings illustrating examples of the setting of the excess air ratio in the pre-mixture fuel combustion operation of the engine.
Figure 7B:
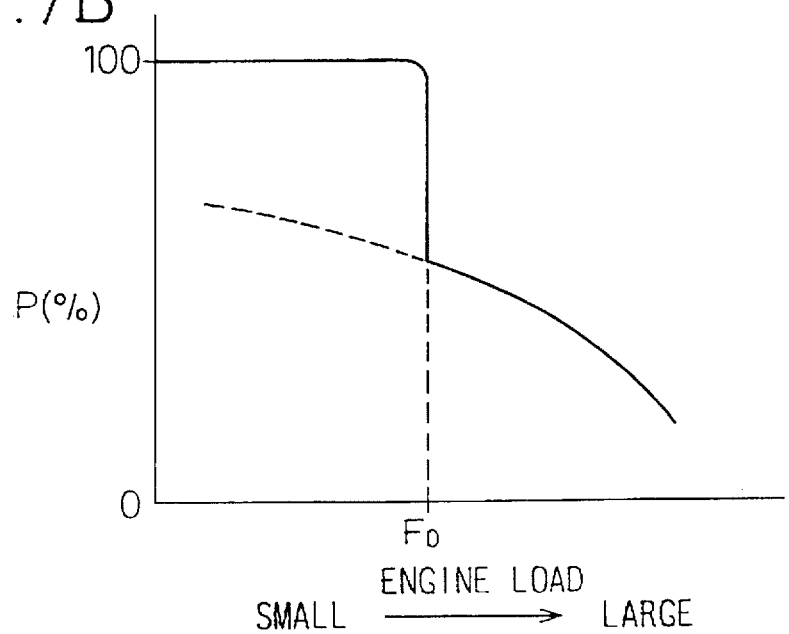

FIGS. 7A and 7B show the case in which combustion mode is changed step-wise when the engine load becomes lower than a predetermined load, and FIG. 7A shows the variation of the excess air ratio 1 in accordance with the load, and FIG. 7B shows the variation in the percentage P of the amount of the fuel which contributes to pre-mixture fuel combustion to the total amount of fuel supplied to the combustion chamber. In a diesel engine, during normal operation, the excess air ratio $\lambda$ increases as the engine load is reduced as shown by the broken lines in FIG. 7A. On the other hand, the proportion of fuel which contributes to pre-mixture fuel combustion gradually increases (broken line in FIG. 7B) as the engine load decreases even in the normal operation of a diesel engine. In contrast to this, in this embodiment, as shown by the solid line in FIGS. 7A and 7B, operation is performed so that the proportion of pre-mixture fuel combustion is increased suddenly (FIG. 7B) at a predetermined load ($F_0$ in the drawing), while $\lambda$ is reduced suddenly (FIG. 7A).

Figure 8A:
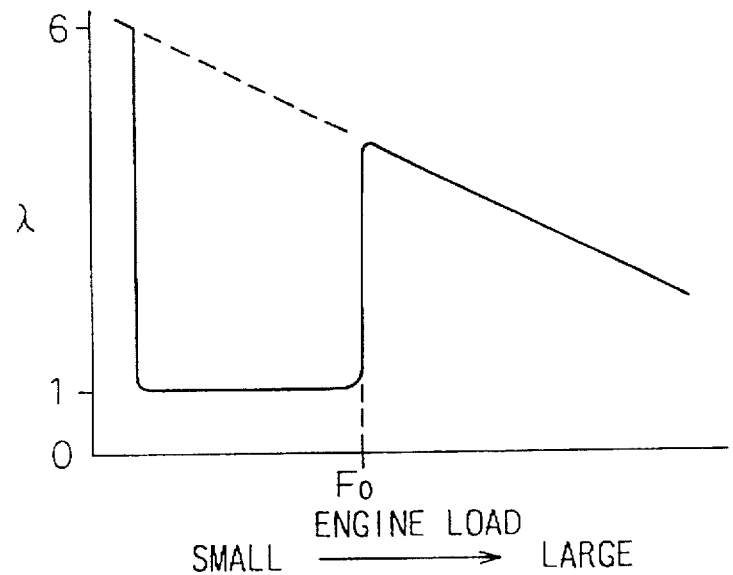
FIGS. 8A and 8B are drawings illustrating examples of the setting of the excess air ratio in the pre-mixture fuel combustion operation of the engine.
Figure 8B:
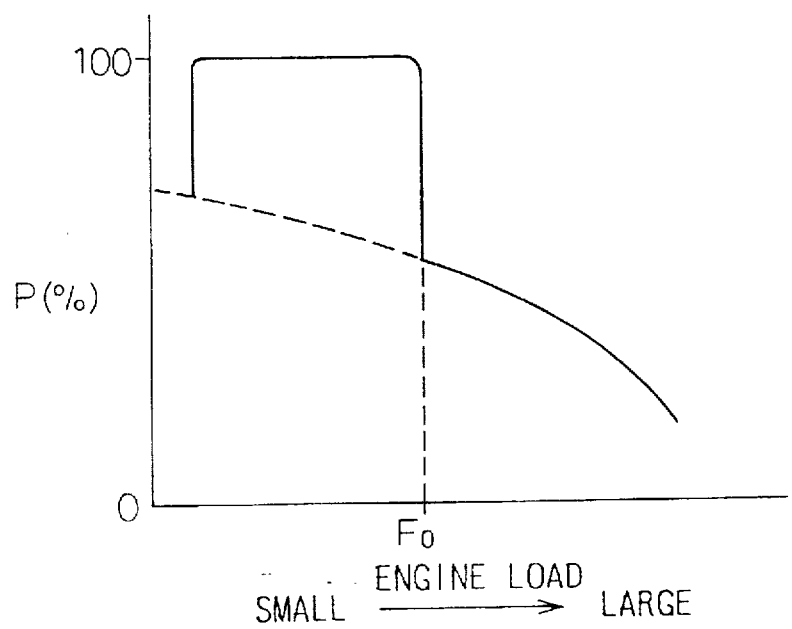

FIGS. 8A and 8B show another embodiment of switching between diesel combustion mode and pre-mixture fuel combustion mode. In this embodiment, similarly to that of FIGS. 7A and 7B, sudden switching to pre-mixture fuel combustion is made at a given load ($F_0$), except that in this case, at extremely low loads, at which combustion is unstable, normal diesel combustion is resumed to achieve stable combustion.

Figure 9A:
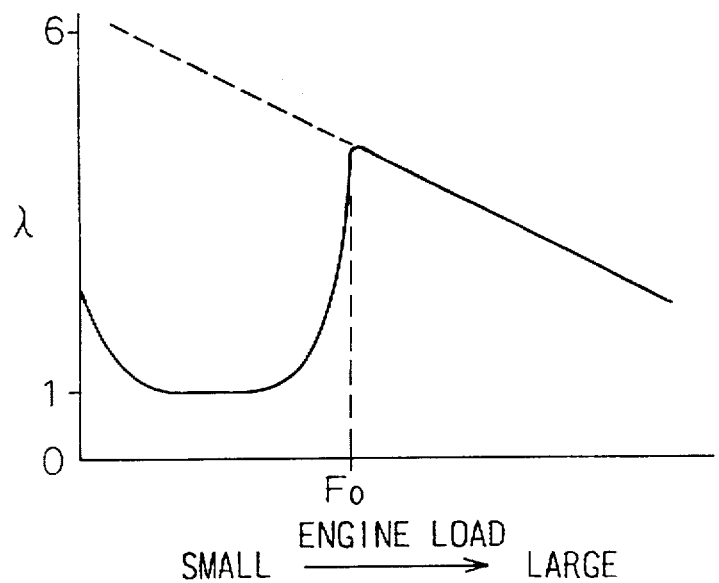
FIGS. 9A and 9B are drawings illustrating examples of the setting of the excess air ratio in the pre-mixture fuel combustion operation of the engine.
Figure 9B:
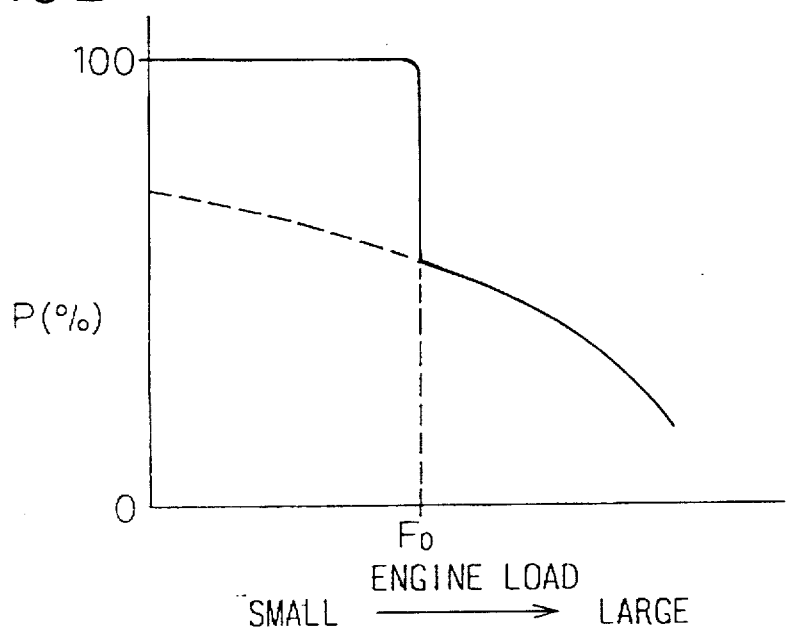

FIGS. 9A and 9B show the case in which, while the switching between pre-mixture fuel combustion and diesel combustion is made in step-wise fashion, as is in the case of FIGS. 7A and 7B, the excess air ratio $\lambda$ is reduced gradually as the load is reduced, and is slightly increased at very low load range, so that operation with excess air ratio slightly higher than 1.0 is performed in a low load range.

Figure 10A:
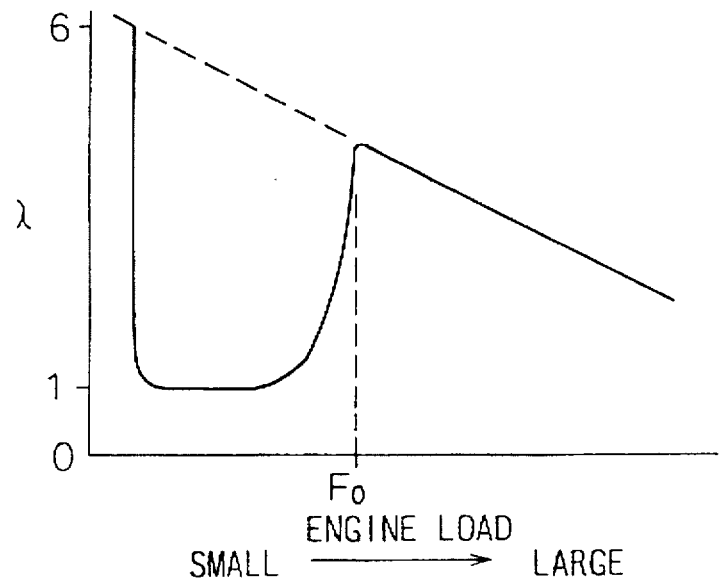
FIGS. 10A and 10B are drawings illustrating examples of the setting of the excess air ratio in the pre-mixture fuel combustion operation of the engine.
Figure 10B:
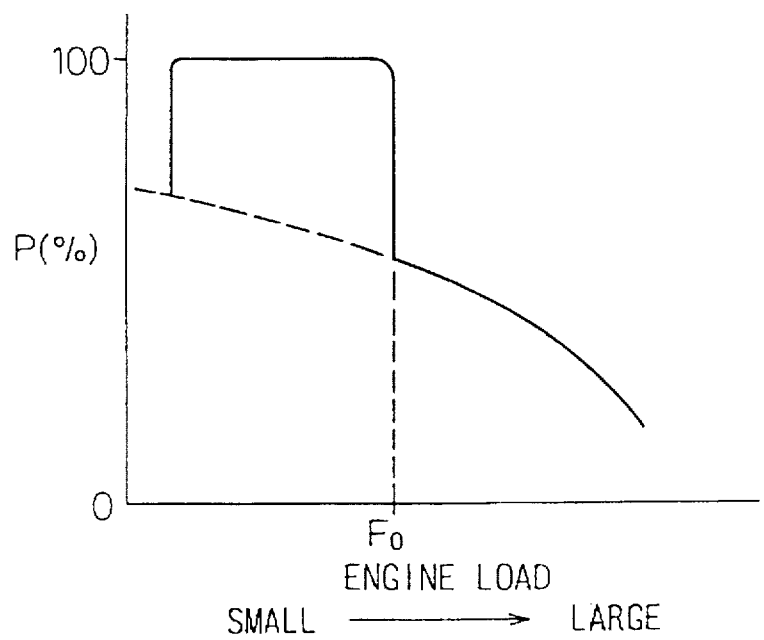

FIGS. 10A and 10B show an example in which $\lambda$ is gradually reduced in FIGS. 8A and 8B in the same manner as in FIGS. 9A and 9B, when the switch is made from diffusive combustion to pre-mixture fuel combustion.

When lowering the excess air ratio $\lambda$ as described above in the region of light load, if only the amount of fuel injection is increased to lower the excess air ratio $\lambda$, the amount of injected fuel becomes excessively large, and the influence of the above-mentioned explosive combustion also becomes large. For this reason, it is preferable to reduce the amount intake air at the same time when the amount of fuel is increased. In this case, since increase in the fuel injection amount can be kept small even if the excess air ratio is reduced, the influence of explosive combustion can be further reduced.

In this embodiment, as shown in FIG. 5, since the intake restriction valve 81 and the EGR valve 73 for recirculating exhaust gas are provided in the intake manifold, the amount of intake air can be reduced by either of the restriction of the intake air by the intake restriction valve 81 and the recirculation of the exhaust gas by the EGR valve 73, or both. Therefore, the amount of fuel injected into the combustion chamber can be reduced as much as possible when the excess air ratio $\lambda$ is reduced.

While the problems associated with explosive combustion during pre-mixture fuel combustion were explained above, other problems may arise when the combustion mode of the diesel engine is switched to a mode in which pre-mixture fuel combustion is dominant. For example, since conditions for combustion are satisfied too quickly within the combustion chamber in the pre-mixture fuel combustion, the problem that firing occurs excessively early in the compression stroke may arise. Further, since a relatively small amount of fuel is diffused throughout the entire volume of the combustion chamber in pre-mixture fuel combustion, misfiring or delay in firing of the air-fuel pre-mixture may occur due to dilution of the fuel.

These problems can be solved by the method described below.

For example, with regard to the problem of early firing and delayed firing, these problems can be solved by controlling the conditions which influence the firing of fuel, such as the internal cylinder temperature and pressure during the compression stroke as explained before, in such a manner that firing occurs at the appropriate timing. In this embodiment, the timing of the firing is adjusted by controlling the amounts of intake air and exhaust gas recirculation by the intake restriction valve 81 and the EGR valve 73 in FIG. 5, respectively, in accordance with the amount of fuel contributing to pre-mixture fuel combustion in such a manner that firing occurs within proper timing range (for example, in the region near the top dead center in the compression stroke).

FIG. 11A through FIG. 13B show examples of the variation in the setting of the intake restriction and the amount of exhaust gas recirculation in order to maintain the firing timing within the proper timing range when the amount of fuel contributing to pre-mixture fuel combustion is changed in step-wise fashion as shown in FIG. 7B.

Figure 11A:
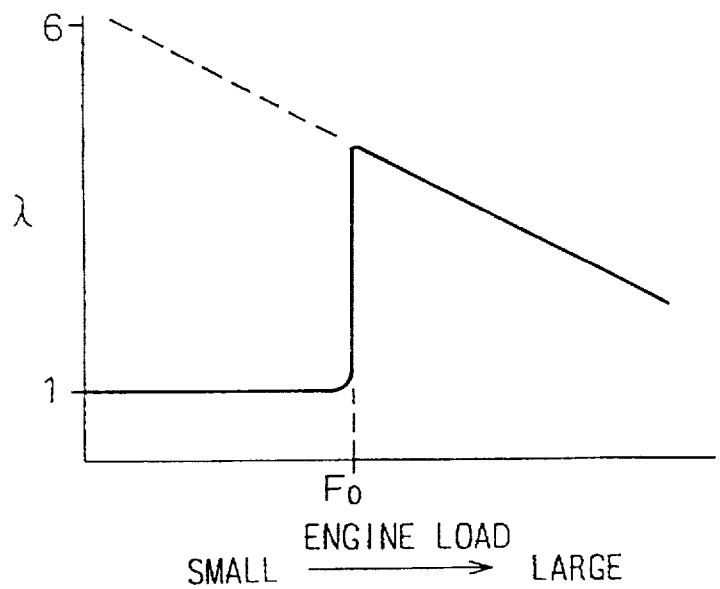
FIGS. 11A and 11B are drawings illustrating examples of the setting of the exhaust gas recirculation amount in the pre-mixture fuel combustion operation of the engine.
Figure 11B:
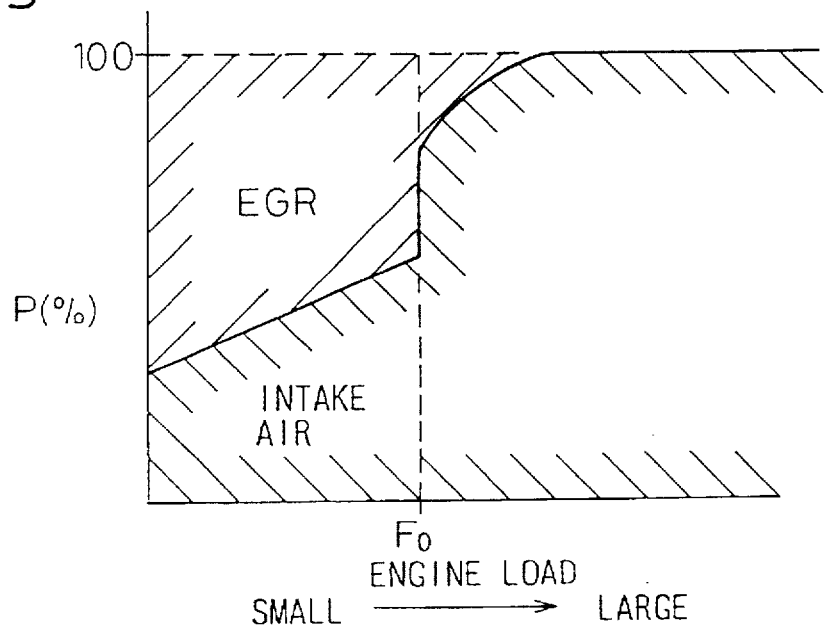

FIG. 11A shows the variation of the excess air ratio $\lambda$ with respect to a change in the engine load, which is the same as that shown in FIG. 7A. FIG. 11B shows the variation of the ratio Q between the amount of intake air supplied to the cylinder (after it is adjusted by the intake restriction) and the amount of exhaust gas recirculation (EGR). Since the amount of fuel injection is reduced when the engine load decreases, it is required to reduce the amount of intake air in order to reduce the excess air ratio when the engine is operated at low load. When the amount of new air taken into the cylinder is reduced, a drop in the internal cylinder pressure causes a delay in the temperature within the cylinder reaching the combustion temperature, and the problems such as delayed firing or misfiring tend to occur. To solve this problem, in this embodiment, as shown in FIG. 11B, when the amount of injected fuel is reduced by the intake restriction, the amount of exhaust gas recirculation is increased to make up for this reduction in intake air. By doing this, the pressure in the cylinder is maintained within a proper range, and the timing of firing is maintained within a proper range.

Figure 12A:
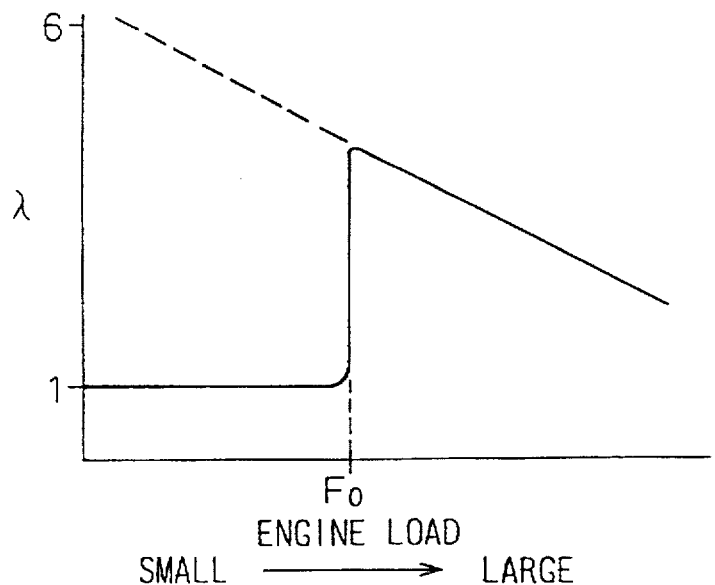
FIGS. 12A and 12B are drawings illustrating examples of the setting of the exhaust gas recirculation amount in the pre-mixture fuel combustion operation of the engine.
Figure 12B:
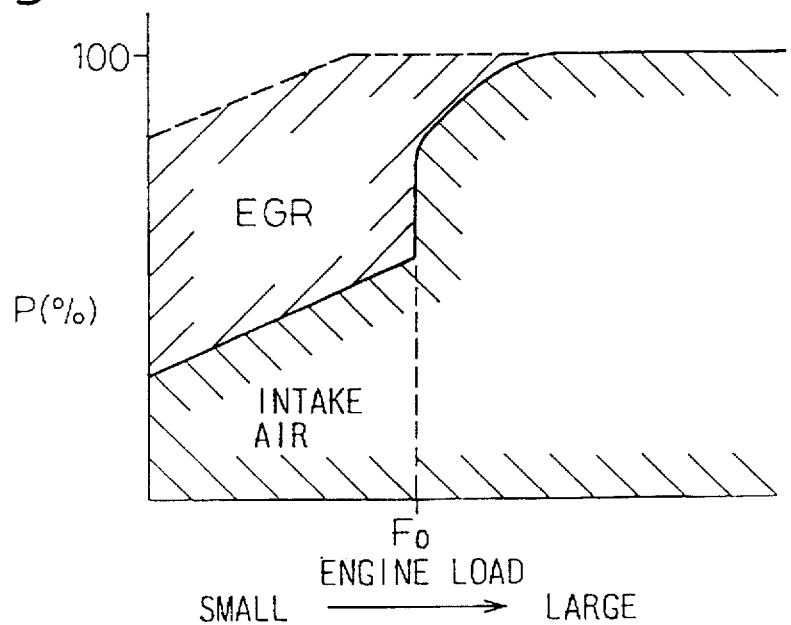

FIG. 12A and FIG. 12B show an example in which the amount of the exhaust gas recirculation is reduced in a low load region in order to prevent unstable combustion due to insufficient oxygen concentration in the cylinder caused by the exhaust gas recirculation. By reducing the amount of the exhaust gas recirculation with respect to the amount of intake air when the engine load is low, the oxygen concentration in the air-fuel pre-mixture in the cylinder can be maintained high even in the engine low load region. In this case, while the pressure within the cylinder drops, because of the high temperature of the recirculated exhaust gas, the temperature in the cylinder does not drop, so that firing is not delayed even if the pressure in the cylinder drops.

Figure 13A:
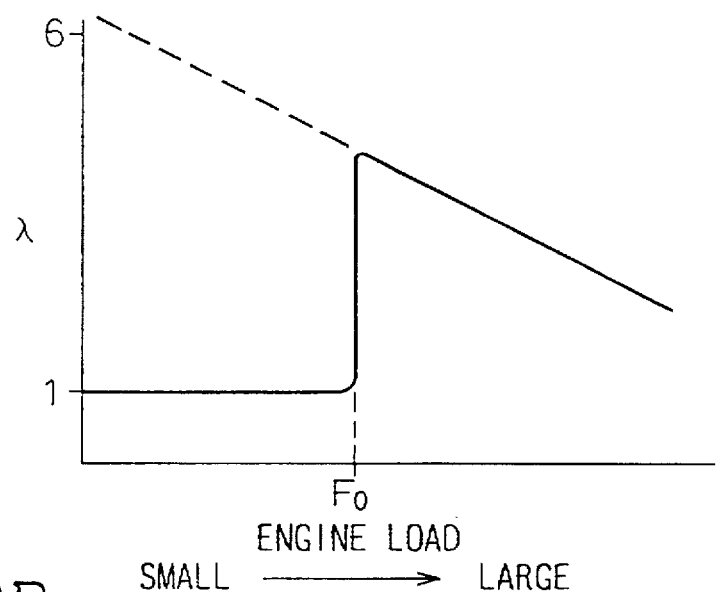
FIGS. 13A and 13B are drawings illustrating examples of the setting of the exhaust gas recirculation amount in the pre-mixture fuel combustion operation of the engine.
Figure 13B:
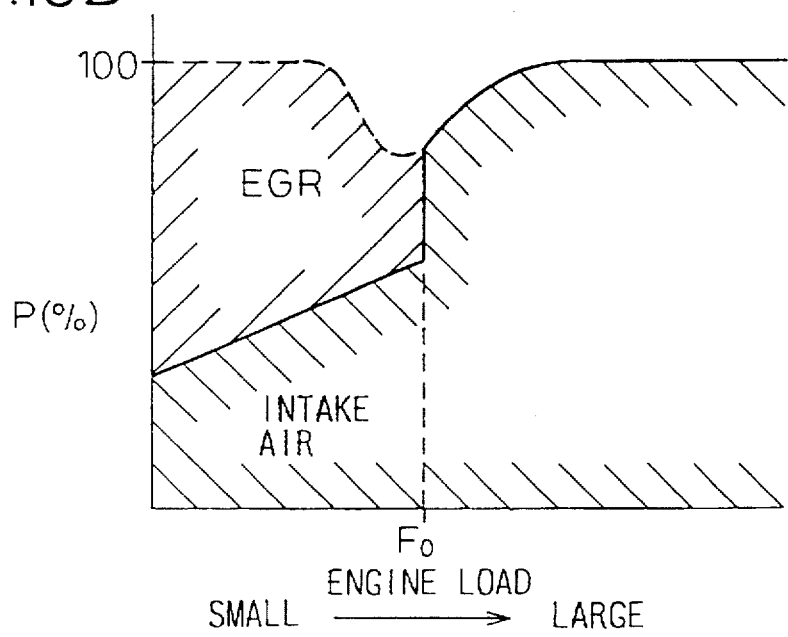

FIG. 13A and FIG. 13B show an example in which the amount of the exhaust gas recirculation when pre-mixture fuel combustion is performed in a relatively high engine load. When the engine load is relatively high, early firing may occur when the amount of the exhaust gas recirculation is reduced since, when the amount of exhaust gas recirculation is reduced, the oxygen concentration in the cylinder increases. In this embodiment, the amount of the exhaust gas recirculation is further reduced in such a manner that the total amount of the intake air and recirculating exhaust gas decreases as a whole. By decreasing the total amount of intake air and exhaust gas in the cylinder, the pressure in the cylinder is decreased, thereby the timing at which the temperature in the cylinder reaches the combustion temperature can be delayed to prevent early firing.

When performing pre-mixture fuel combustion, it is possible to form a combustible air-fuel pre-mixture, as described earlier, by advancing the timing of fuel injection. In this case, the injected fuel mixes with air in the cylinder and diffuses throughout the cylinder. However, in the low-load range, if complete mixture of fuel and air is done, diffusion of the fuel results in a relatively low value of fuel concentration in the air-fuel mixture, and may cause a difficulty in firing. In view of this problem, a portion of fuel to be supplied to the combustion chamber is injected at normal fuel injection timing even if the combustion mode is switched to pre-mixture fuel combustion when the engine load is relatively low.

Figure 14:
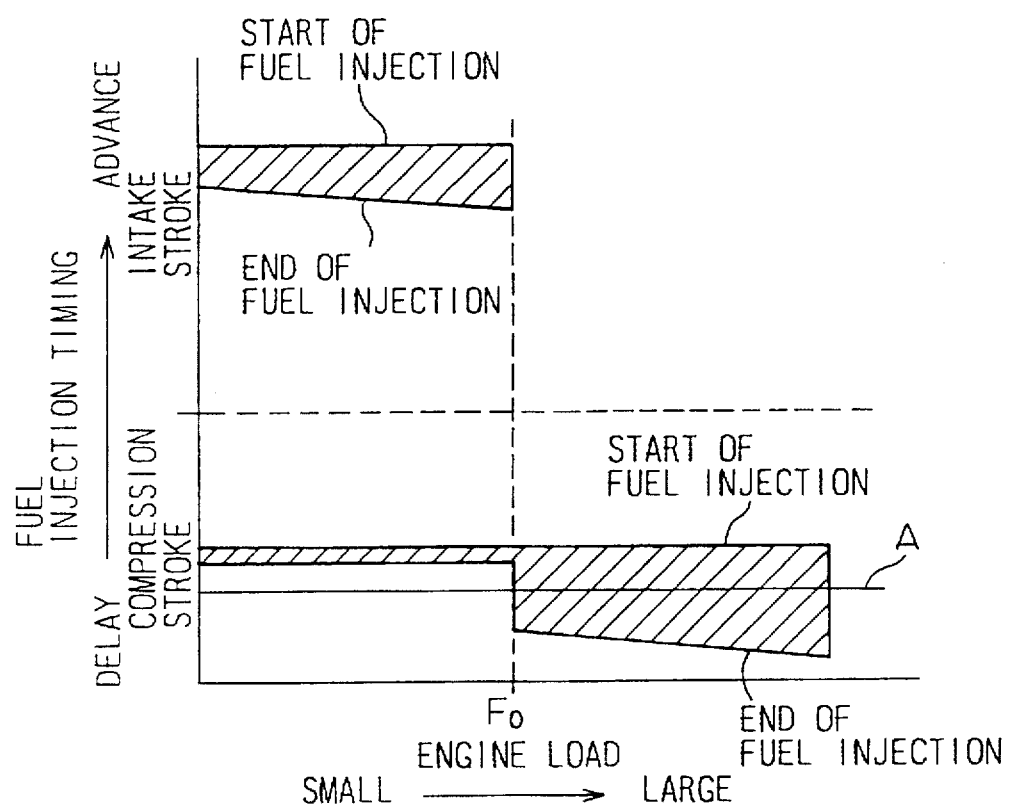
FIG. 14 is a drawing illustrating an example of the setting of the timing of the fuel injection in the pre-mixture fuel combustion operation of the engine.

FIG. 14 shows the relationship between the timing of the fuel injection and the engine load in this embodiment.

In FIG. 14, the horizontal axis represents the engine load, and the vertical axis represents the timing of the fuel injection. As shown by FIG. 14, the engine is operated in the normal diesel combustion mode when the engine load is above a predetermined load ($F_0$ in FIG. 14), also in this embodiment. That is, in the region above the load $F_0$, the injection of fuel is started in the latter half of the compression stroke, and combustion starts when the temperature inside the cylinder exceeds the firing temperature of the fuel. In FIG. 14, the line marked A indicates the timing at which the temperature in the cylinder reaches the firing temperature of fuel, i.e., the timing at which combustion starts in the cylinder. As shown by FIG. 14, the fuel injection in the normal operation is started before the timing at which the temperature in the cylinder reaches the firing temperature.

In this embodiment, in the region in which the engine load is below $F_0$, the injection of fuel is largely advanced, so that fuel injection starts during the start of the intake stroke. By advancing the fuel injection timing, a uniform air-fuel mixture is formed inside the cylinder, although there is a possibility of misfiring due to the diffusion of the injected fuel. To prevent this misfiring, the entire amount of fuel required is not injected during the intake stroke, but rather a part of the fuel is injected during the intake stroke, after which, in the same timing as normal operation, fuel is injected immediately before the temperature within the cylinder reaches the fuel combustion temperature. Therefore, the fuel injected immediately before the temperature reaches the combustion temperature burns before it diffuses throughout the cylinder. Thus, reliable firing of the fuel injected at the normal timing, as well as the fuel in the air-fuel mixture already formed in the cylinder can be obtained. Therefore, the problem of misfiring is prevented from occurring.

Next, turning to FIG. 15, the switching between the normal diesel combustion mode in which diffusive combustion is dominant and the combustion mode in which pre-mixture fuel combustion is dominant is explained. When the combustion mode of the engine is switched from the normal diesel combustion to the pre-mixture fuel combustion mode with a reduced excess air ratio, a fluctuation of the engine output torque may occur due to the difference in the combustion speed and increase in the fuel injection amount.

Figure 15A:
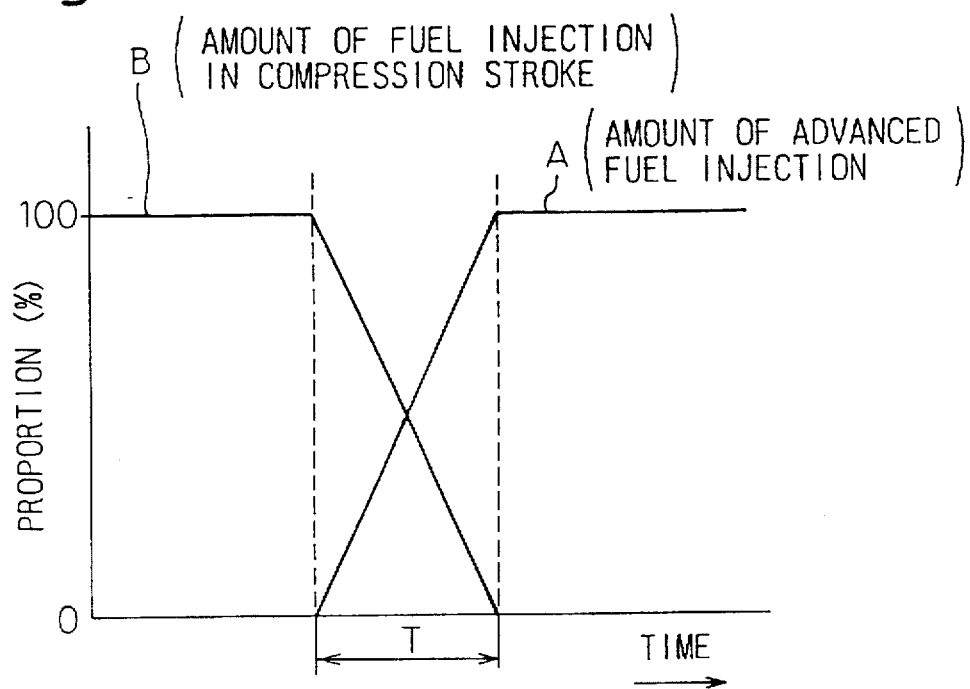
FIGS. 15A and 15B are drawings illustrating examples of the setting of the timing of fuel injection when the combustion mode is switched between a diesel combustion and pre-mixture fuel combustion.
Figure 15B:
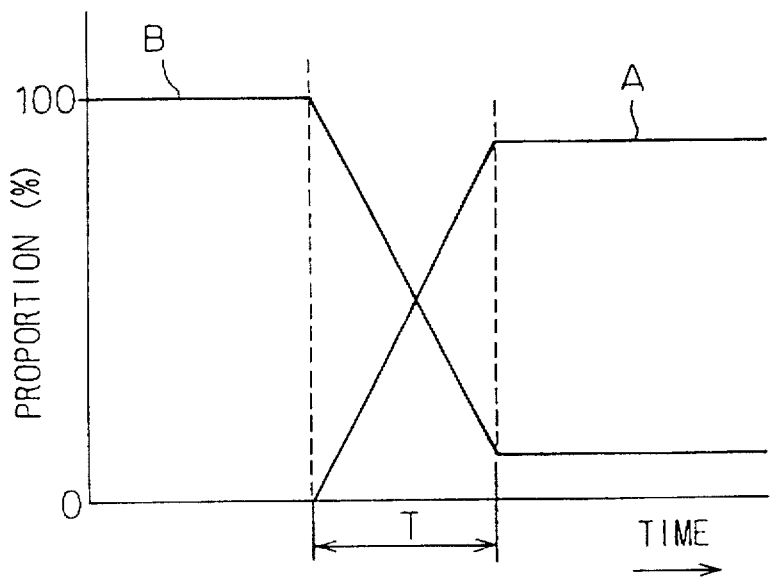

FIG. 15A and FIG. 15B show an example in which the occurrence of a torque shock is prevented by avoiding a sudden change of the combustion condition, i.e., by gradually switching between diffusive combustion and pre-mixture fuel combustion. In FIG. 15A and FIG. 15B, curve A shows the percentage proportion of fuel that is injected early (for example, during the intake stroke) with respect to the total amount of fuel injected, while curve B shows the percentage proportion of fuel that is injected at the normal fuel injection timing (the latter half of the compression stroke) with respect to the total amount of fuel injected. The horizontal axis of these drawings represents the elapsed time when switching from diffusive combustion to pre-mixture fuel combustion is made, the time T indicated in FIG. 15A and FIG. 15B being the time during which the transition from diffusive combustion to pre-mixture fuel combustion is completed.

Turning first to FIG. 15A, during normal operation, the entire amount (100%) of fuel is injected in the latter half of the compression stroke in this embodiment, and when switching is done to pre-mixture fuel combustion, during the time period T, the amount of fuel which is injected during the latter part of the compression stroke is gradually reduced, so that it reaches zero at the completion of the time period T (curve B). Conversely, during normal operation, the amount of fuel that is injected early is zero, and when switching is done to pre-mixture fuel combustion, this amount is increased during the time period T from zero to 100%. That is, during the time period T of transition from diffusive combustion to pre-mixture fuel combustion, both early injection and compression stroke injection are done. In this manner, there is no sudden switching from diffusive combustion to pre-mixture fuel combustion occurs, since a period of time T, during which a gradual transition from diffusive combustion to pre-mixture fuel combustion within the cylinder, is provided. Therefore, sudden change in the engine output torque due to switching between diffusive combustion and pre-mixture fuel combustion does not occur.

FIG. 15B shows an example in which a small amount of fuel is injected in the latter part of the compression stroke, as in the case of pre-mixture fuel firing described in FIG. 14, after a gradual switch from diffusive combustion to pre-mixture fuel combustion is performed. In this case, even after the completion of the transition time period T, the amount of fuel injected during the compression stroke does not fall to zero, i.e., a small amount of fuel is injected during the compression stroke even in pre-mixture fuel combustion mode.

In both FIG. 15A and FIG. 15B, though only the transition from diffusive combustion to pre-mixture fuel combustion is explained, when switching from pre-mixture fuel combustion to diffusive combustion is performed, if the switching is done gradually, there is complete prevention of a torque shock accompanying the switch made between diffusive combustion and pre-mixture fuel combustion.

Figure 17:
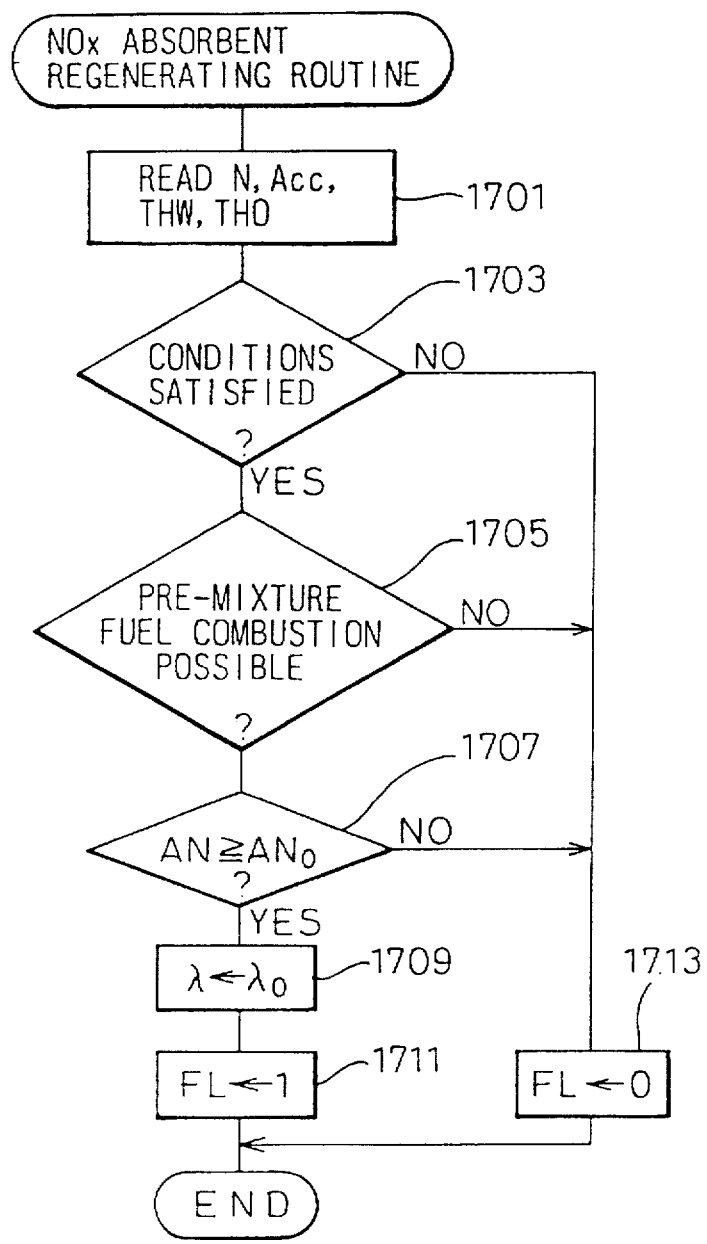
FIG. 17 is a flowchart illustrating an example of the control of regenerating operation of a $NO_x$ absorbent.

Turning next to FIG. 16 through FIG. 18, the control of the engine is explained for the case in which the $NO_x$ absorbent of FIG. 1 and FIG. 5 is regenerated by operating the diesel engine 1 with a reduced excess air ratio.

FIG. 16 is an engine control flowchart which is executed by the engine control circuit 20. This flowchart shows the case in which, whenever the engine operating conditions reach conditions which allows pre-mixture fuel combustion, the combustion mode is switched to pre-mixture fuel combustion mode, and at the same time, the excess air ratio $\lambda$ is reduced to below 1, to regenerate the $NO_x$ absorbent 5.

In FIG. 16, at step 1601, the engine cooling water temperature THW, the lubricating oil temperature THO, the engine speed N, and the accelerator opening degree Acc are read in from each corresponding sensor, and at step 1603, it is determined whether the condition required for pre-mixture fuel combustion is satisfied. To perform pre-mixture fuel combustion, it is necessary that the engine be sufficiently warmed up, and that the condition of the engine be stable. Thus, at step 1603, the achievement of at least the predetermined temperatures for the cooling water and lubricating oil are made prerequisite conditions. If at step 1603 the prerequisite conditions have not be satisfied, control proceeds to step 1611, at which the value of the flag FL is set to zero, and this routine terminates at this point. When the value of the flag FL is set to zero, pre-mixture fuel combustion is not performed, and a separate fuel injection control routine (not shown in the drawing) which is executed by the engine control circuit 20 controls the amount of fuel injection and timing of fuel injection at for normal operation, i.e., the engine is operated in the normal diesel combustion mode in which diffusive combustion is dominant.

If, however, the prerequisite conditions are satisfied at step 1603, it is determined, at step 1605, whether the current operating conditions (load condition) are in the range which permits pre-mixture fuel combustion. This determination is made based on the accelerator opening degree Acc and the speed N of the engine, using a map of FIG. 6A or FIG. 6B.

At step 1605, if the current load condition is in the region which enables pre-mixture fuel combustion (hatched area in FIG. 6A or FIG. 6B), at step 1607, the value of the excess air ratio 1 is set to $\lambda_0$, and at step 1609, the value of the flag FL is set to 1. When the value of the flag FL is set to 1, by means of a separate routine that is executed by the engine control circuit 20, the value of the excess air ratio 1 is controlled to be $\lambda_0$, by means of one of the methods explained before, and the engine is operated in the pre-mixture fuel combustion mode. At step 1607, the value of the excess air ratio is set at $\lambda_0 \leq 1.0$ when the map in FIG. 6A is used, and set at a value determined by the accelerator opening degree and the engine speed when the map in FIG. 6B is used.

According to this embodiment, operation with reduced excess air ratio is performed frequently during the operation of the engine, in accordance with the operating conditions, i.e., the air-fuel ratio of the exhaust gas flowing into the $NO_x$ absorbent 5 becomes rich frequently, thus regeneration of the $NO_x$ absorbent 5 is done frequently thereby preventing saturation of the $NO_x$ absorbent 5.

Next, turning to FIG. 17, another example of engine control for the purpose of regenerating the $NO_x$ absorbent 5 will be described.

In the embodiment shown in FIG. 16, in the case in which the engine is operating in a load range which permits pre-mixture fuel combustion, pre-mixture fuel combustion with the excess air ratio kept reduced is performed, so that regeneration of the $NO_x$ absorbent 5 is done. However, if regeneration of the $NO_x$ absorbent 5 is done in this manner in a specific load range, depending upon the engine operating conditions, regeneration of the $NO_x$ absorbent 5 might be done when the amount of $NO_x$ absorbed in the $NO_x$ absorbent 5 is small, in which case regeneration is not required. Therefore, in the embodiment shown in FIG. 16, the frequency of operating with a reduced excess air ratio increases, leading to a risk of worsened fuel consumption. In this embodiment, in consideration of this point, even in the load range in which operation by pre-mixture fuel combustion, is possible, when the amount of $NO_x$ absorbed in the $NO_x$ absorbent 5 is small, in which case regeneration is not required, normal operation by diesel combustion is done.

In FIG. 17, in the steps 1701 through 1705, the reading in of operating conditions parameters (step 1701), a test for the prerequisite conditions for pre-mixture fuel combustion (step 1703) and a test of the load range (step 1705) are performed. Because these steps are the same as steps 1601 through 1605, respectively, in FIG. 16, they will not be explicitly described herein. In the case in which conditions are not satisfied at steps 1703 and 1705, as in FIG. 16, after setting the flag FL to zero at step 1713, the routine is terminated. By doing this, the engine is operated by normal diesel combustion, which is chiefly diffusive combustion.

In the case in which conditions for pre-mixture fuel combustion are satisfied at steps 1703 and 1705, step 1707 is executed. At step 1707, a test is made as to whether or not the amount of $NO_x$ absorbed by the $NO_x$ absorbent 5 equals or exceeds a predetermined amount $AN_o$.

If the amount of $NO_x$ absorbed by the $NO_x$ absorbent 5 is less than the predetermined amount $AN_O$ at step 1707, the operation of regenerating the $NO_x$ absorbent 5 is not performed and, after executing step 1713, this routine is terminated. That is, only if the amount of $NO_x$ absorbed by the $NO_x$ absorbent 5 is equal to or more than the predetermined amount, i.e., only if regeneration of the $NO_x$ absorbent 5 is actually required, does the routine proceed to steps 1709 and 1711, in which pre-mixture fuel combustion operation with a reduced excess air ratio is performed.

Next, the test performed at step 1707, with regard to the amount of $NO_x$ absorbed by the $NO_x$ absorbent 5, will be described.

The amount of $NO_x$ absorbed per unit time by the $NO_x$ absorbent 5 is considered to be directly proportional to the amount of $NO_x$ generated by the engine 1 per unit time. This amount of $NO_x$ generated by the engine 1 per unit time varies in accordance with the engine output torque (accelerator opening degree) and the intake air amount (engine speed). In this embodiment, an actual engine is tested, with the accelerator opening degree and engine speed being varied to measure the amount of $NO_x$ generated per unit time at various operating conditions, and the measured values are stored in the ROM 23 of the control circuit 20 in the form of a numerical map which uses accelerator opening degrees and engine speeds.

The control circuit 20, in a separate routine (not shown in the drawing), reads in the accelerator opening degree Acc and the engine speed N at predetermined intervals, and calculates, from the above-noted map, the amount of $NO_x$ generated by the engine per unit time, and also accumulates this value of the amount of $NO_x$ generated by the engine to calculated the accumulated amount of $NO_x$ generated, AN. This accumulated amount of generated $NO_x$ AN is directly proportional to the amount of $NO_x$ absorbed in the $NO_x$ absorbent 5. At step 1707 of FIG. 17, the above-noted calculated value of $NO_x$ generated is used as the amount of $NO_x$ absorbed by the $NO_x$ absorbent AN, and if this accumulated value of AN exceeds a predetermined value of $AN_O$ (for example, a value corresponding to 70% of the maximum amount of $NO_x$ that the $NO_x$ absorbent 5 is capable of absorbing), step 1709 and step 1711 are executed.

Instead of calculating the amount of $NO_x$ absorbed by the $NO_x$ absorbent from the accumulated amount of $NO_x$ generated by the engine as described above, it is also possible to determine, by approximation, that the amount of $NO_x$ absorbed by the $NO_x$ absorbent has exceeded a predetermined amount when the engine is operated with a high excess air ratio (for example, $\lambda > 1.0$) for more than a predetermined time.

At step 1709 and step 1711, the excess air ratio $\lambda$ is set to the value $\lambda_1$ (where $\lambda_1 \leq 1.0$) (step 1709), an operation by pre-mixture fuel combustion, in which the excess air ratio is reduced, is done (step 1711). In this case, this reduced excess air ratio operation is executed only during the period of time required for regeneration of the $NO_x$ absorbent 5 (for example, from several seconds to several tens of seconds), and when this period of time has elapsed, the value of the calculated amount of $NO_x$ absorbed by the $NO_x$ absorbent (AN) is set to zero. By setting the value of AN to zero, when the routine in FIG. 17 is next executed, it is determined that the amount of $NO_x$ absorbed in the $NO_x$ absorbent is small (AN $<AN_0$) at step 1707, and step 1713, which operates the engine in the normal diesel combustion mode, is executed.

According to this embodiment, because operation with a reduced excess air ratio is performed only when it is really necessary to perform regeneration of the $NO_x$ absorbent 5, a worsening of fuel consumption of the engine is prevented.

FIG. 18 shows a variation of FIG. 17. In this embodiment, the control performed could be thought of as being positioned midway between the control of the embodiment of FIG. 16 and the control of the embodiment of FIG. 17. Specifically, in this embodiment, in the case in which one of the conditions for pre-mixture fuel combustion is not satisfied (steps 1803 and 1805), operation by normal diesel combustion is done (step 1815), and in the case in which both conditions for pre-mixture fuel combustion are satisfied (steps 1803 and 1805), the engine is operated continuously by pre-mixture fuel combustion (step 1807). However, in the case in which pre-mixture fuel combustion is performed, the setting of the excess air ratio $\lambda$ is changed in accordance with whether the amount AN of $NO_x$ absorbed by the $NO_x$ absorbent 5 is larger than the predetermined amount $AN_O$ (step 1809). Specifically, in the case in which the amount AN of absorbed $NO_x$ has not reached the predetermined amount $AN_O$, the excess air ratio $\lambda$ is changed to the value $\lambda_2$, which is larger than 1.0, so that pre-mixture fuel combustion with a relatively high excess air ratio is performed (step 1811).

In the case in which the judgment is made that the amount AN of $NO_x$ absorbed by the $NO_x$ absorbent 5 has exceeded the predetermined value of $AN_O$, the excess air ratio $\lambda$ is changed to the value $\lambda_1$, which is equal to or less than 1.0, so that regeneration of the $NO_x$ absorbent 5 is performed (step 1813). In this embodiment, the excess air ratio $\lambda_1$ during regeneration of the $NO_x$ absorbent is set at a lower value than in the embodiments shown in FIG. 16 and FIG. 17, so that the regeneration is completed in a short period of time (for example, from 0.5 second to about several seconds) by setting the excess air ratio lower. In this embodiment as well, when the regeneration operation is completed, the value AN of the amount of $NO_x$ absorbed by the $NO_x$ absorbent is set to zero.

In this manner, by operating the engine in the pre-mixture fuel combustion mode with the excess air ratio $\lambda$ larger than 1.0 in a predetermined load range, and reducing the excess air ratio to a value which is equal or less than 1.0 only for the short period of time required, the combustion mode is not switched even when the regeneration of the $NO_x$ absorbent 5 is performed (i.e., only the excess air ratio is reduced). Therefore, the fluctuation in the output torque of the engine accompanying regeneration is minimized. Also, in this embodiment as well, similar to the embodiment of FIG. 17, since the operating with the excess air ratio set to $\lambda > 1.0$ is for only a short period of time, a worsening of fuel consumption of the engine is prevented.

As explained above, according to the present invention, by operating a diesel engine in a combustion mode in which pre-mixture fuel combustion is dominant when regenerating the $NO_x$ absorbent, it becomes possible to reduce the excess air ratio of the engine without generating smoke and the like. Therefore, it becomes possible to use the $NO_x$ absorbent for purifying the exhaust gas of a diesel engine.

We claim:

1. An exhaust gas purification device for a compression-firing internal combustion engine having a direct cylinder fuel injection valve which injects fuel directly into a combustion chamber, said exhaust gas purification device comprising:

a $NO_x$ absorbent which is disposed in an exhaust gas passage of an engine, and which absorbs $NO_x$ in an inflowing exhaust gas when the air-fuel ratio of the exhaust gas flowing into the $NO_x$ absorbent is lean and releases absorbed $NO_x$ when the oxygen concentration of the inflowing exhaust gas is lowered;

excess air ratio reducing means for reducing the excess air ratio of the engine when the $NO_x$ absorbent is to release the absorbed $NO_x$, thereby reducing the oxygen concentration of the exhaust gas flowing into the $NO_x$ absorbent; and combustion control means for controlling combustion of the engine, when the excess air ratio reducing means reduces the excess air ratio of the engine, in such a manner that the amount of the fuel injected from the direct cylinder fuel injection valve which contributes to pre-mixture fuel combustion in the combustion chamber is increased with respect to the amount of the fuel injected from the fuel injection valve which contributes to diffusive combustion in the combustion chamber.

2. An exhaust gas purification device according to claim 1, wherein said combustion control means increases the amount of the fuel contributing to the pre-mixture fuel combustion in the combustion chamber when said excess air ratio reducing means reduces the excess air ratio of the engine by increasing the amount of fuel injected from the direct cylinder fuel injection valve before firing of fuel occurs in the combustion chamber.

3. An exhaust gas purification device according to claim 1, wherein said combustion control means comprises means for promoting vaporization of fuel injected from said direct cylinder fuel injection valve, and increases the amount of fuel contributing to the pre-mixture fuel combustion when said excess air ratio reducing means reduces the excess air ratio of the engine by promoting the vaporization of fuel injected from the direct cylinder fuel injection valve before firing of fuel occurs in the combustion chamber.

4. An exhaust gas purification device according to claim 1, wherein said combustion control means comprises firing timing control means for controlling the timing of the firing of fuel in the combustion chamber, and increases the amount of fuel contributing to the pre-mixture fuel combustion when said excess air ratio reducing means reduces the excess air ratio of the engine by delaying the timing of the firing of fuel in the combustion chamber.

5. An exhaust gas purification device according to claim 3, wherein said combustion control means comprises firing timing control means for controlling the timing of the firing of fuel in the combustion chamber, and further increases the amount of fuel contributing to the pre-mixture fuel combustion when said excess air ratio reducing means reduces the excess air ratio of the engine by delaying the timing of the firing of fuel in the combustion chamber.

6. An exhaust gas purification device according to claim 2, wherein said combustion control means comprises injection timing advancing means for advancing the fuel injection timing of said direct fuel injection valve, and increases the amount of the fuel injected into the combustion chamber before the firing of fuel in the combustion chamber when said excess air ratio reducing means reduces the excess air ratio of the engine by advancing the fuel injection timing of the direct cylinder fuel injection valve.

7. An exhaust gas purification device according to claim 2, wherein said combustion control means comprises fuel injection rate controlling means for controlling amount of fuel injected per unit time by the direct cylinder fuel injection valve, and increases the amount of the fuel injected into the combustion chamber before the firing of fuel in the combustion chamber when said excess air ratio reducing means reduces the excess air ratio of the engine by changing the temporal distribution of the fuel injection rate of the direct cylinder fuel injection valve.

8. An exhaust gas purification device according to claim 3, wherein said means for promoting vaporization of fuel comprises means for increasing a swirl inside the combustion chamber, and promotes the vaporization of fuel injected from the direct cylinder fuel injection valve by increasing the swirl inside the combustion chamber.

9. An exhaust gas purification device according to claim 3, wherein said means for promoting vaporization of fuel comprises EGR means for recirculating a part of the exhaust gas from the engine into the combustion chamber, and promotes the vaporization of fuel injected from the direct cylinder fuel injection valve by recirculating the exhaust gas in the combustion chamber.

10. An exhaust gas purification device according to claim 4, wherein said firing timing control means delays the timing of the firing of fuel in the combustion chamber by lowering the pressure in the combustion chamber during a compression stroke.

11. An exhaust gas purification device according to claim 5, wherein said firing timing control means delays the timing of the firing of fuel in the combustion chamber by lowering the pressure in the combustion chamber during a compression stroke.

12. An exhaust gas purification device according to claim 4, wherein said firing timing control means delays the timing of the firing of fuel in the combustion chamber by lowering the temperature in the combustion chamber during a compression stroke.

13. An exhaust gas purification device according to claim 5, wherein said firing timing control means delays the timing of the firing of fuel in the combustion chamber by lowering the temperature in the combustion chamber during a compression stroke.

14. An exhaust gas purification device according to claim 10, wherein said firing timing control means comprises means for reducing the amount of air taken into the combustion chamber during intake stroke of the cylinders, and lowers the pressure in the combustion chamber during the compression stroke by reducing the amount of air taken into the combustion chamber during the intake stroke.

15. An exhaust gas purification device according to claim 10, wherein said firing timing control means comprises means for lowering compression ratio of the cylinders, and lowers the pressure in the combustion chamber during the compression stroke by lowering the compression ratio of the cylinders.

16. An exhaust gas purification device according to claim 1, further comprising firing condition controlling means for controlling a condition which influences the firing of fuel in the combustion chamber, and controls said condition in accordance with the amount of fuel which contributes to the pre-mixture fuel combustion in such a manner that the timing of firing of fuel in the combustion chamber is within a predetermined timing range.

17. An exhaust gas purification device according to claim 1, further comprising means for controlling firing conditions which, when the amount of fuel contributing to the pre-mixture fuel combustion is increased by said combustion control means, controls the firing conditions within the combustion chamber so as to facilitate the firing of fuel therein.

18. An exhaust gas purification device according to claim 17, wherein said combustion control means comprises means for advancing the timing of fuel injection of the direct cylinder fuel injection valve, and increasing the amount of fuel contributing to the pre-mixture fuel combustion by advancing the timing of fuel injection with respect to a normal fuel injection timing, and wherein said means for controlling firing conditions comprises means for controlling the fuel injection timing of the direct cylinder fuel injection valve, and facilitates the firing of fuel in the combustion chamber when the fuel injection timing is advanced by said combustion control means by controlling the fuel injection timing of the direct cylinder fuel injection valve so that a part of the fuel to be supplied to the combustion chamber is injected from the direct cylinder fuel injection valve at the normal injection timing.

19. An exhaust gas purification device according to claim 1, wherein said exhaust gas purification device further comprises means for detecting a load condition of the engine, determining means for determining whether the detected load condition is a load condition under which the magnitude of explosive fuel combustion accompanied by the pre-mixture fuel combustion when the amount of fuel contributing to the pre-mixture fuel combustion is increased is within a tolerable range, and permitting means for permitting the excess air ratio reducing means to reducing the excess air ratio only when said determining means determines that the detected load condition is a load condition under which the magnitude of the explosive fuel combustion is within the tolerable range.

20. An exhaust gas purification device according to claim 19, wherein said determining means determines that the detected load condition is the one under which the magnitude of the explosive fuel combustion is within the tolerable range when the detected load condition is within a predetermined low-load range.

21. An exhaust gas purification device according to claim 1, wherein said combustion control means controls the direct cylinder fuel injection valve in such a manner that the said fuel injection valve injects the fuel contributing to the diffusive combustion after it injects the fuel contributing to the pre-mixture fuel combustion, at least when the operating conditions are switched from normal operation to the reduced excess air ratio operation.

* * * * *